Aug. 2, 1966          R. G. HOLMAN          3,264,162
RIBBON WINDING MACHINE WITH INDEXABLE HUBS
Filed April 18, 1963                    18 Sheets-Sheet 1
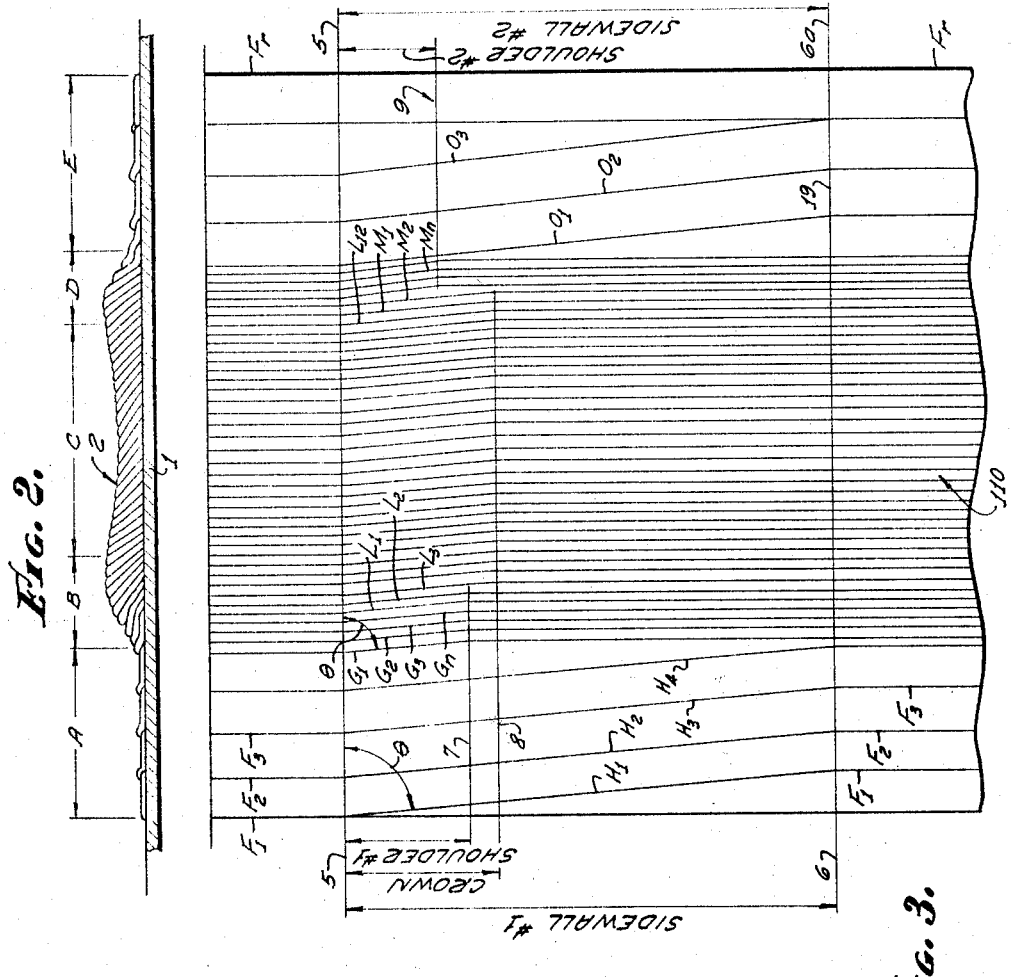
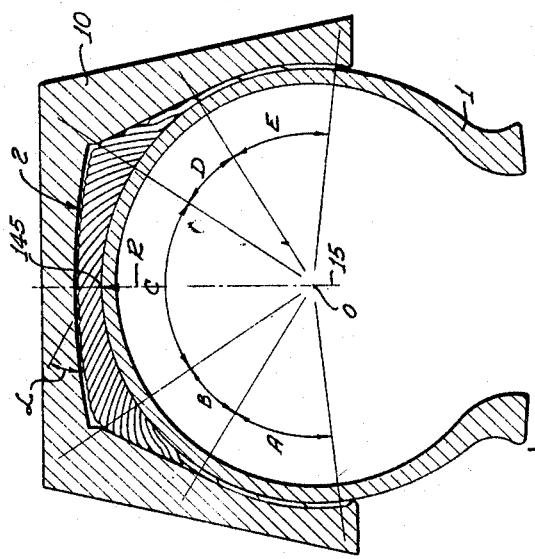
INVENTOR
RUDOLPH G. HOLMAN
BY
Nicholas T Vohr
HIS Attorney INVENTOR.
*Rudolph G. Holman*
BY
*Nicholas T. Voter*
ATTORNEY.

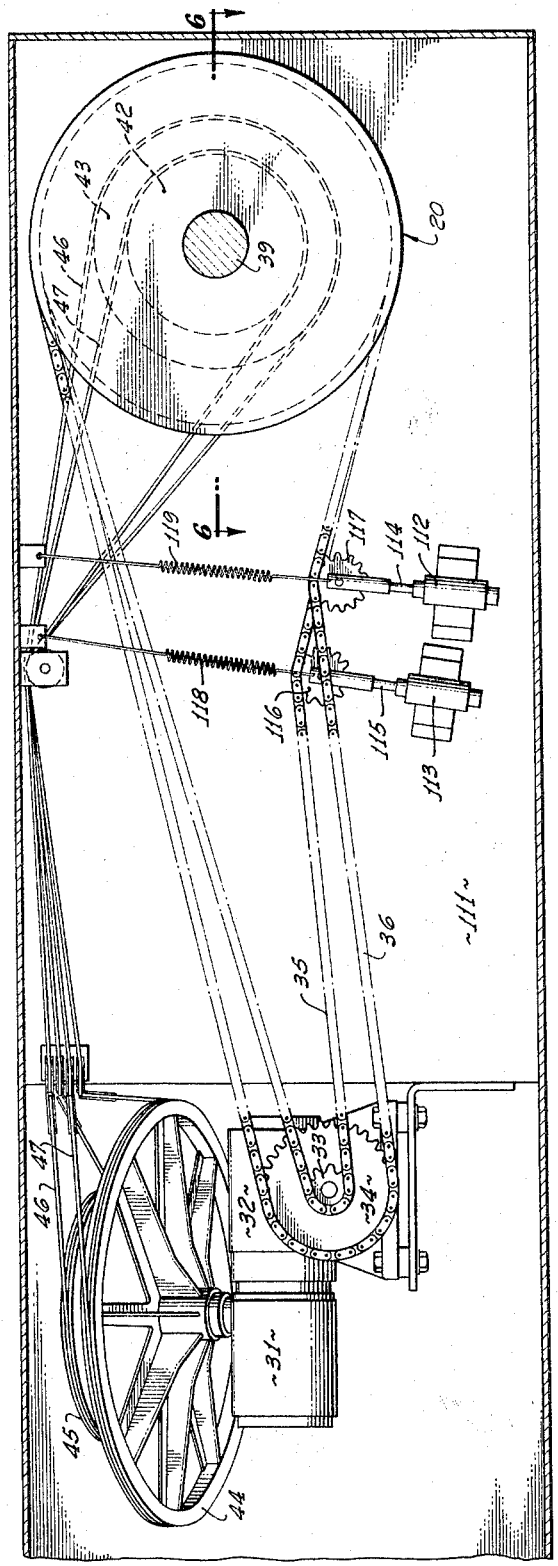
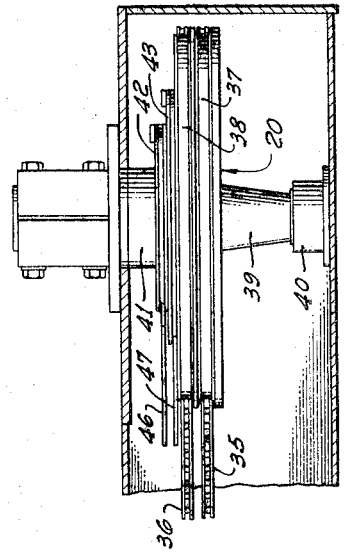

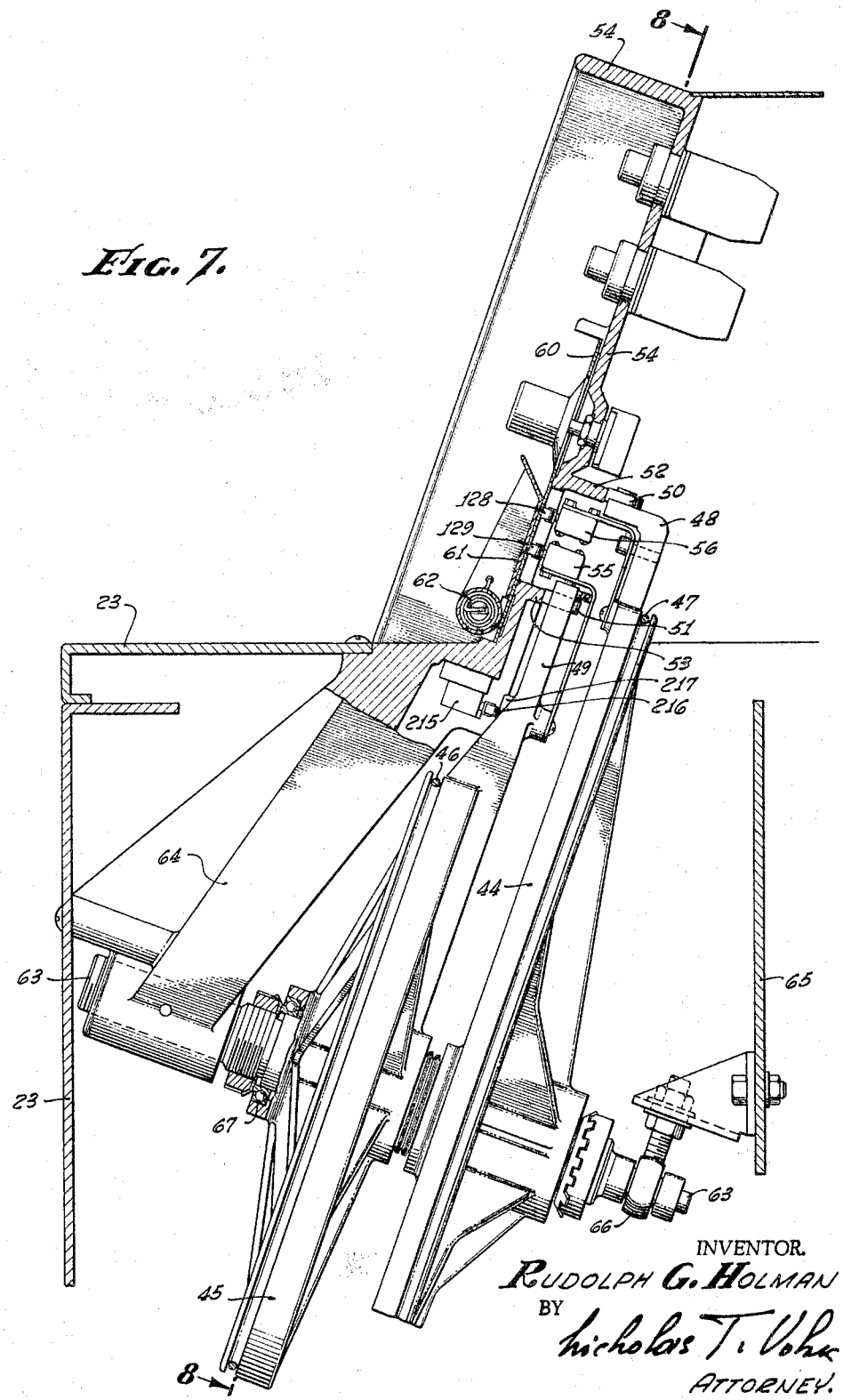

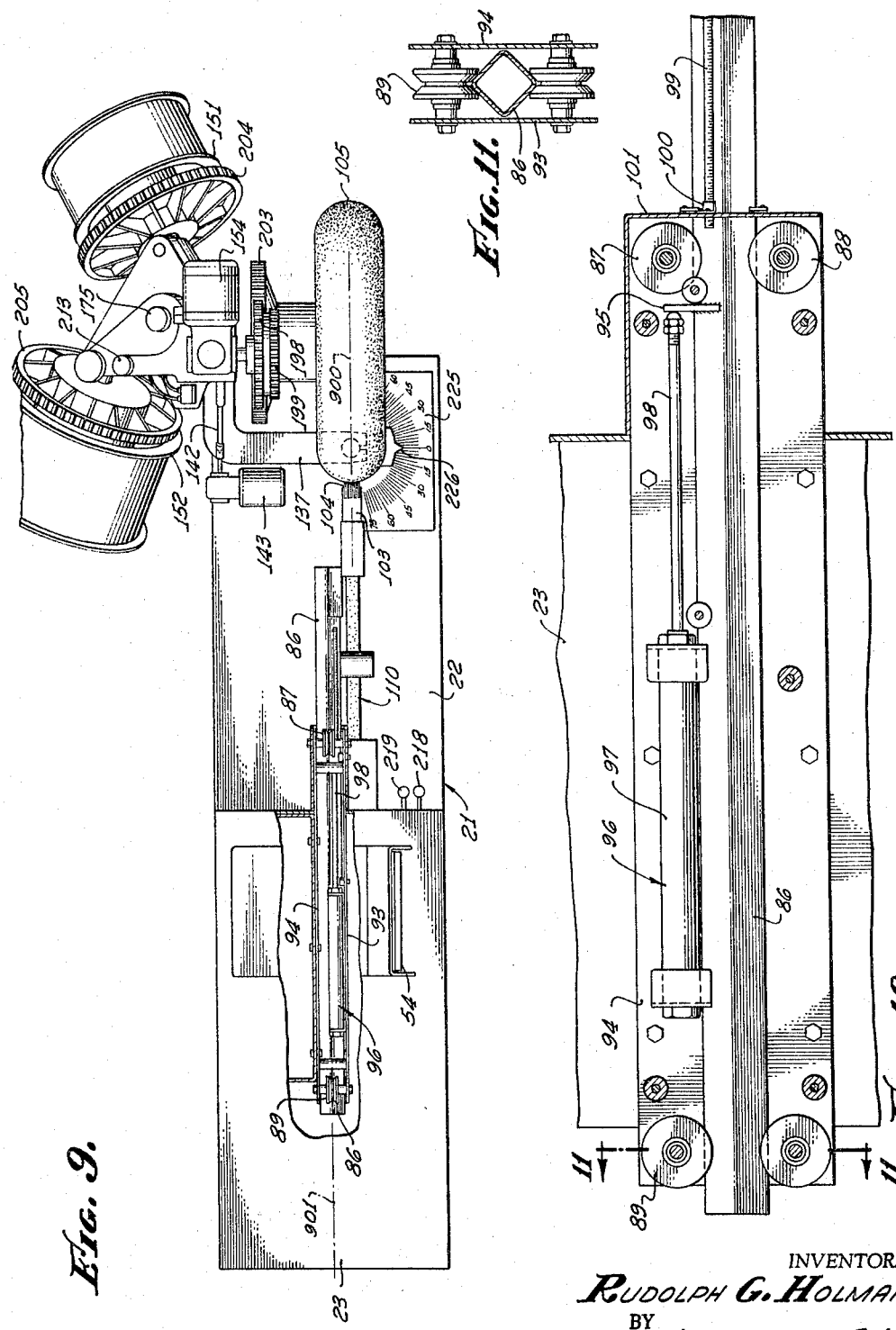

Aug. 2, 1966         R. G. HOLMAN         3,264,162
RIBBON WINDING MACHINE WITH INDEXABLE HUBS
Filed April 18, 1963         18 Sheets-Sheet 7
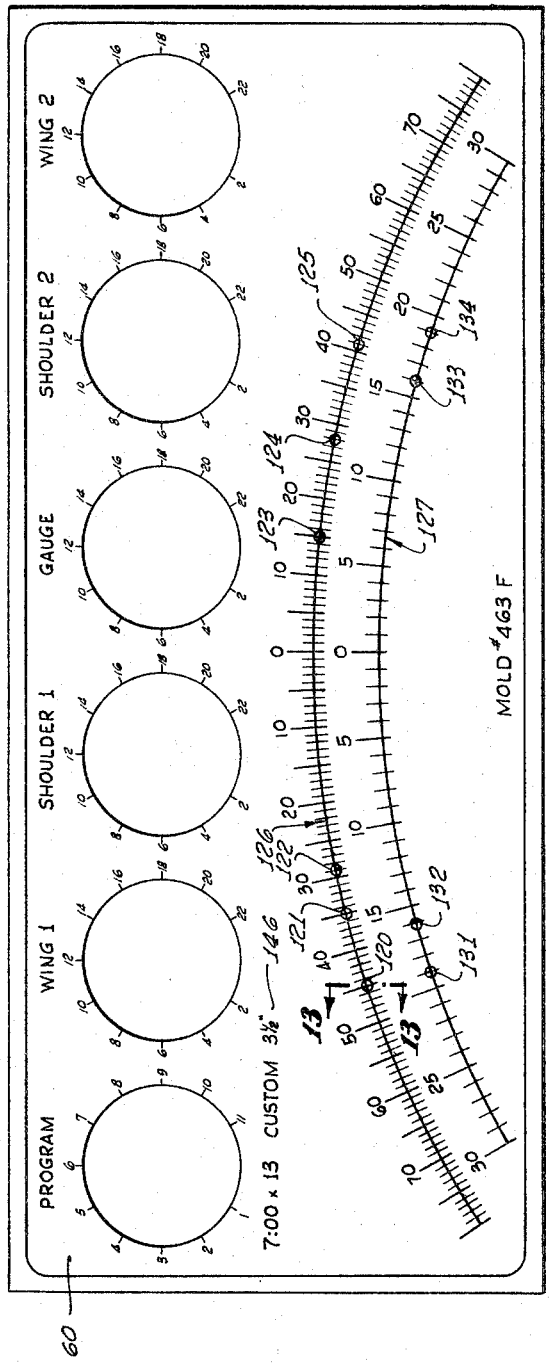
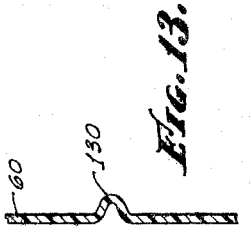
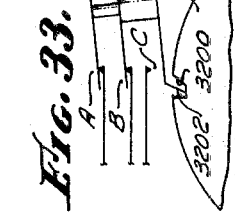
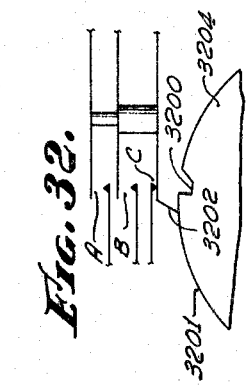
INVENTOR.
*Rudolph G. Holman*
BY
*Nicholas T Volk*
ATTORNEY.

Aug. 2, 1966  R. G. HOLMAN  3,264,162
RIBBON WINDING MACHINE WITH INDEXABLE HUBS
Filed April 18, 1963  18 Sheets-Sheet 9
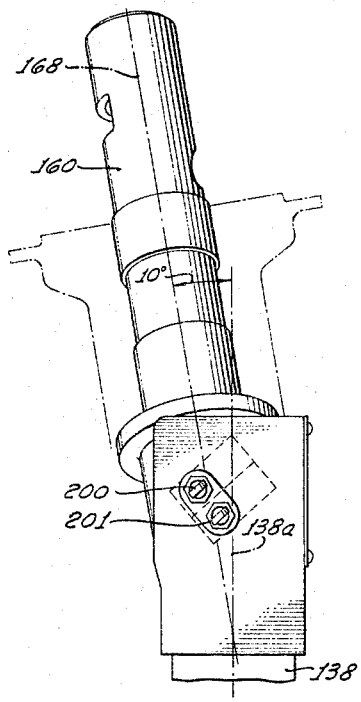
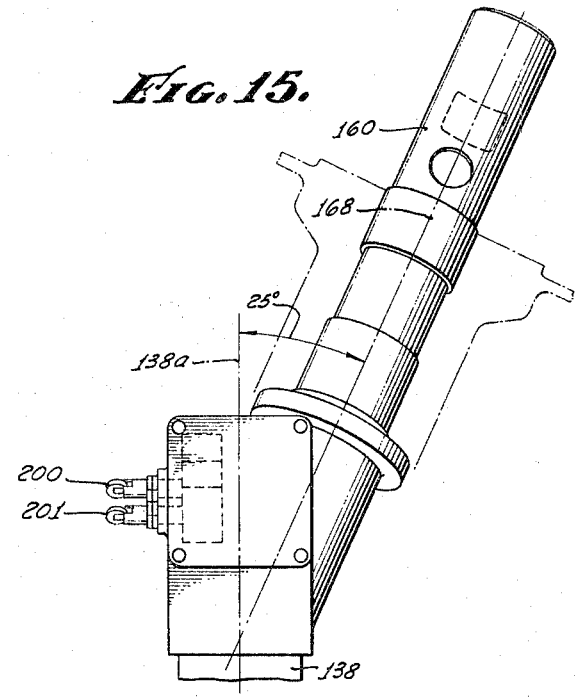
Fig. 15.
Fig. 16.
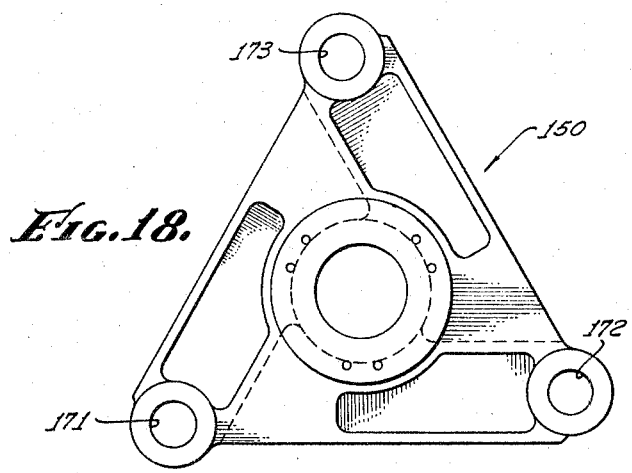
Fig. 18.
Fig. 19.
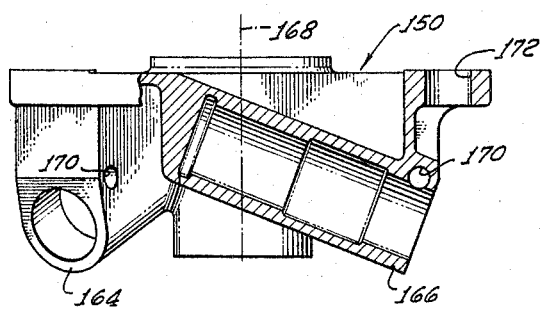
INVENTOR.
RUDOLPH G. HOLMAN
BY
Nicholas T. Volsk
ATTORNEY.

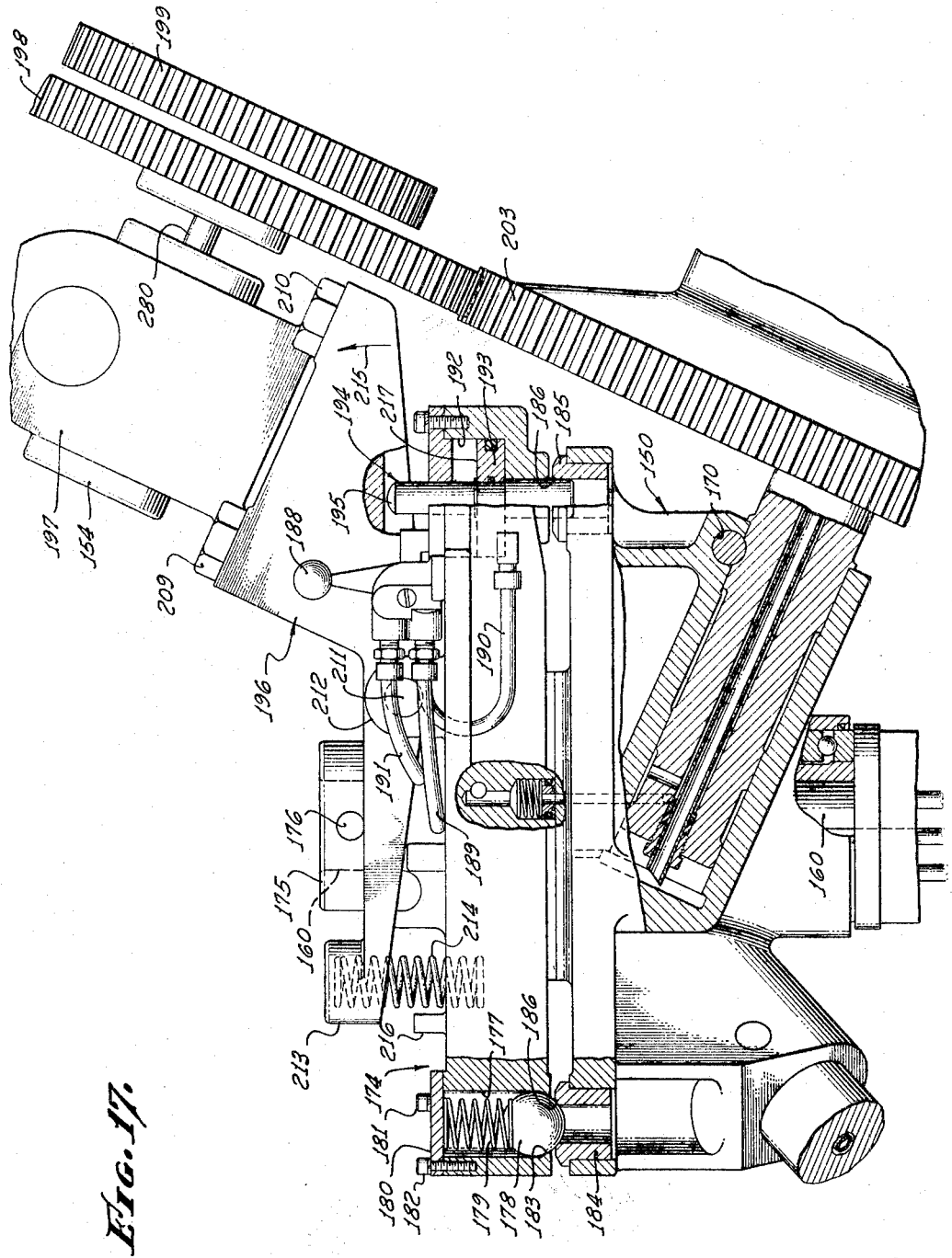

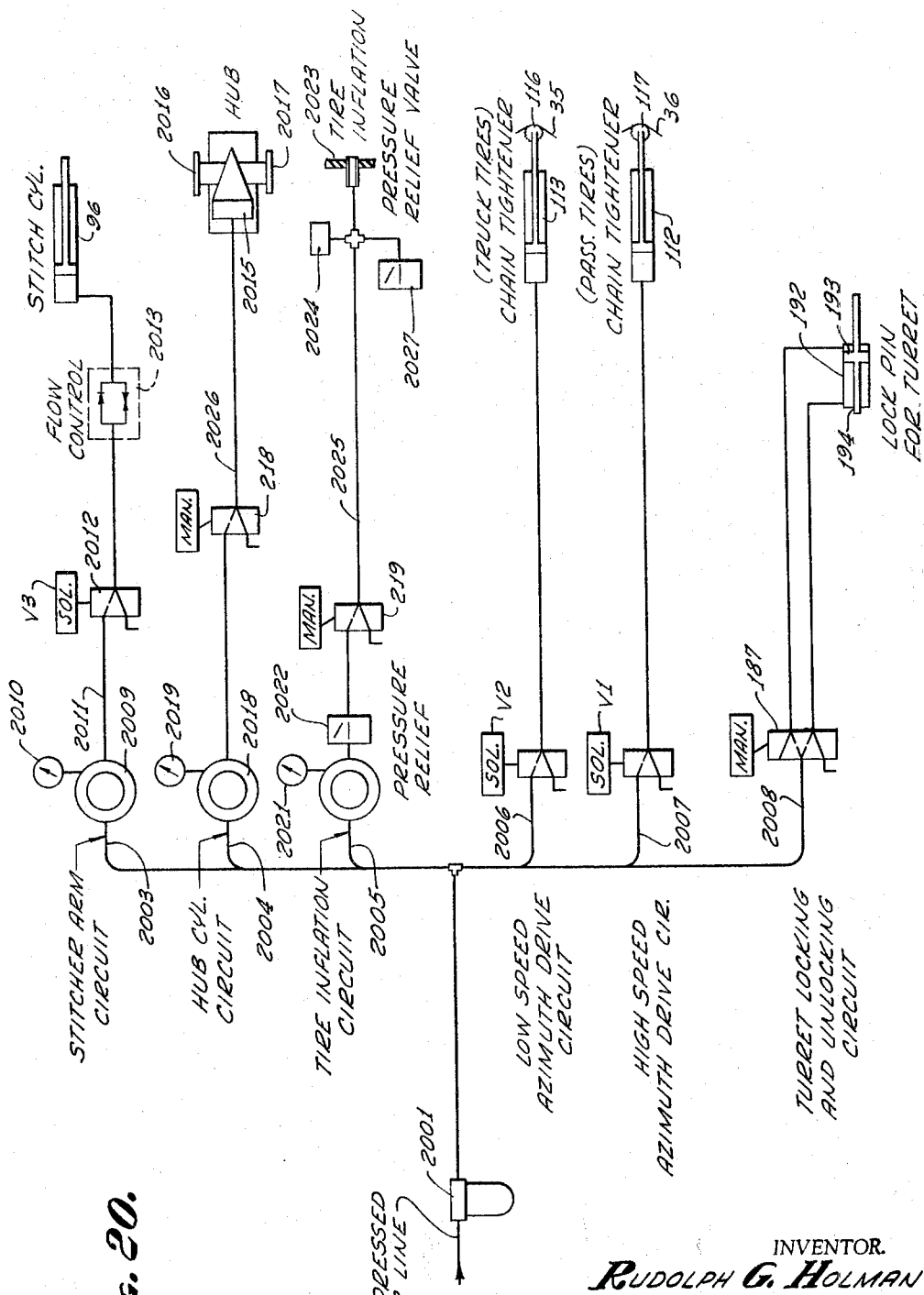

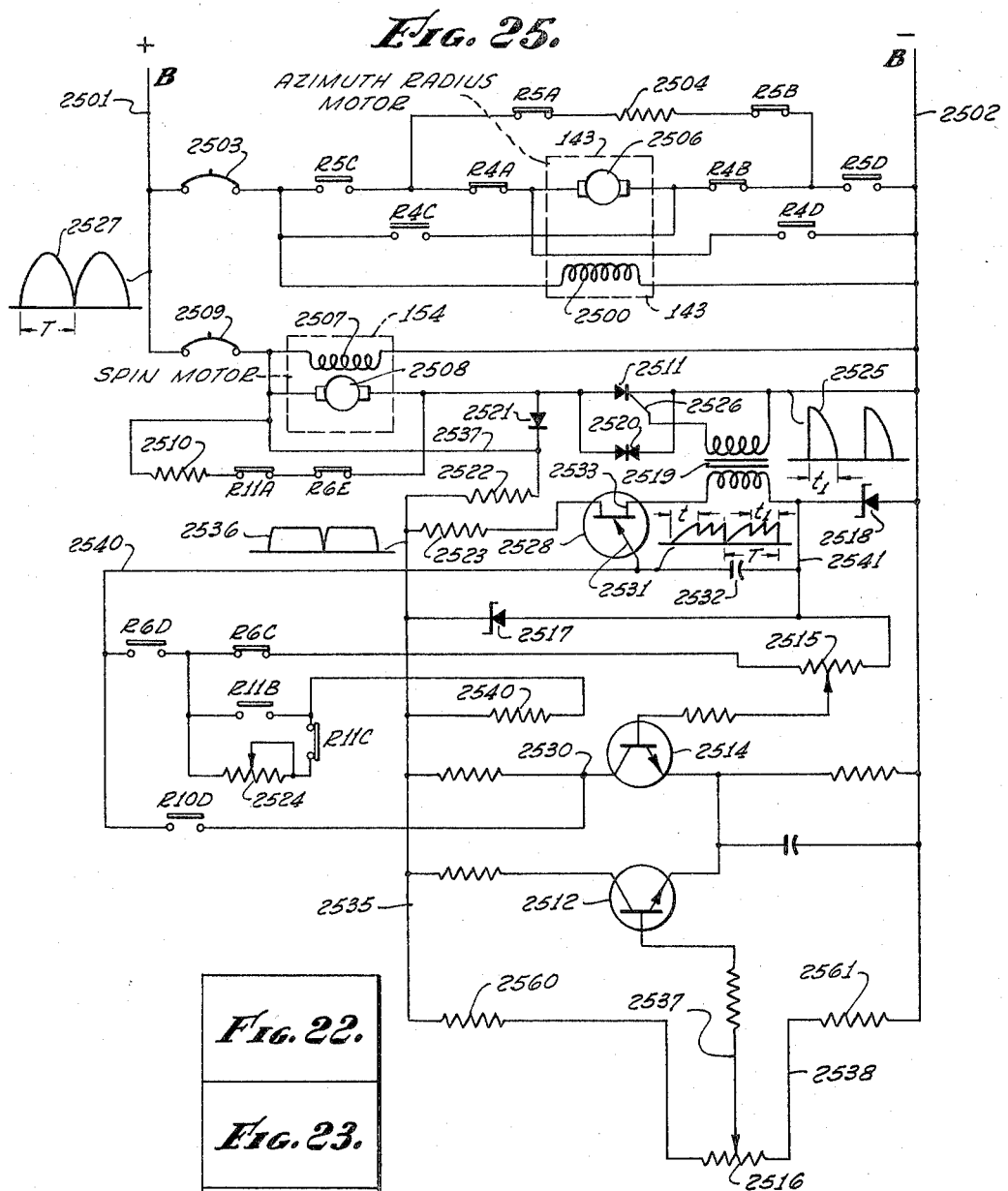

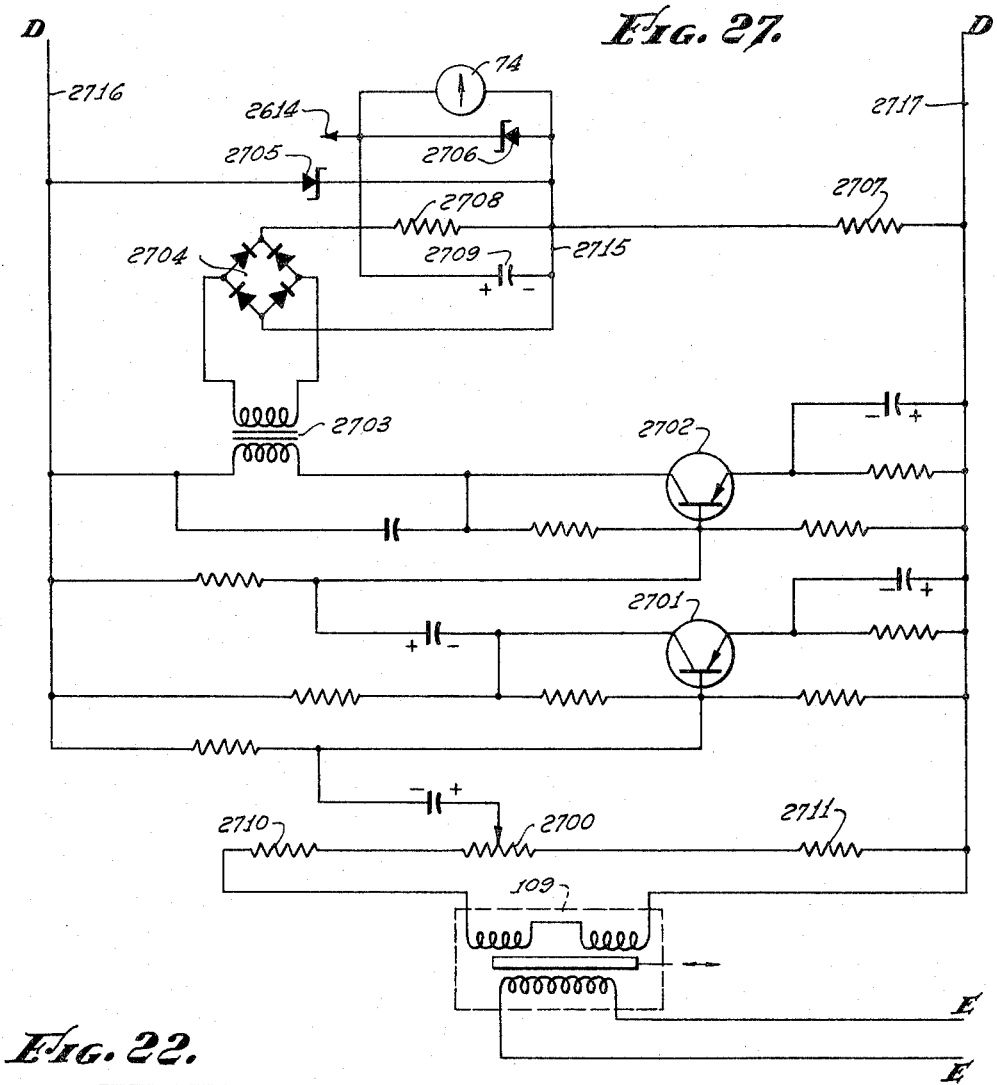

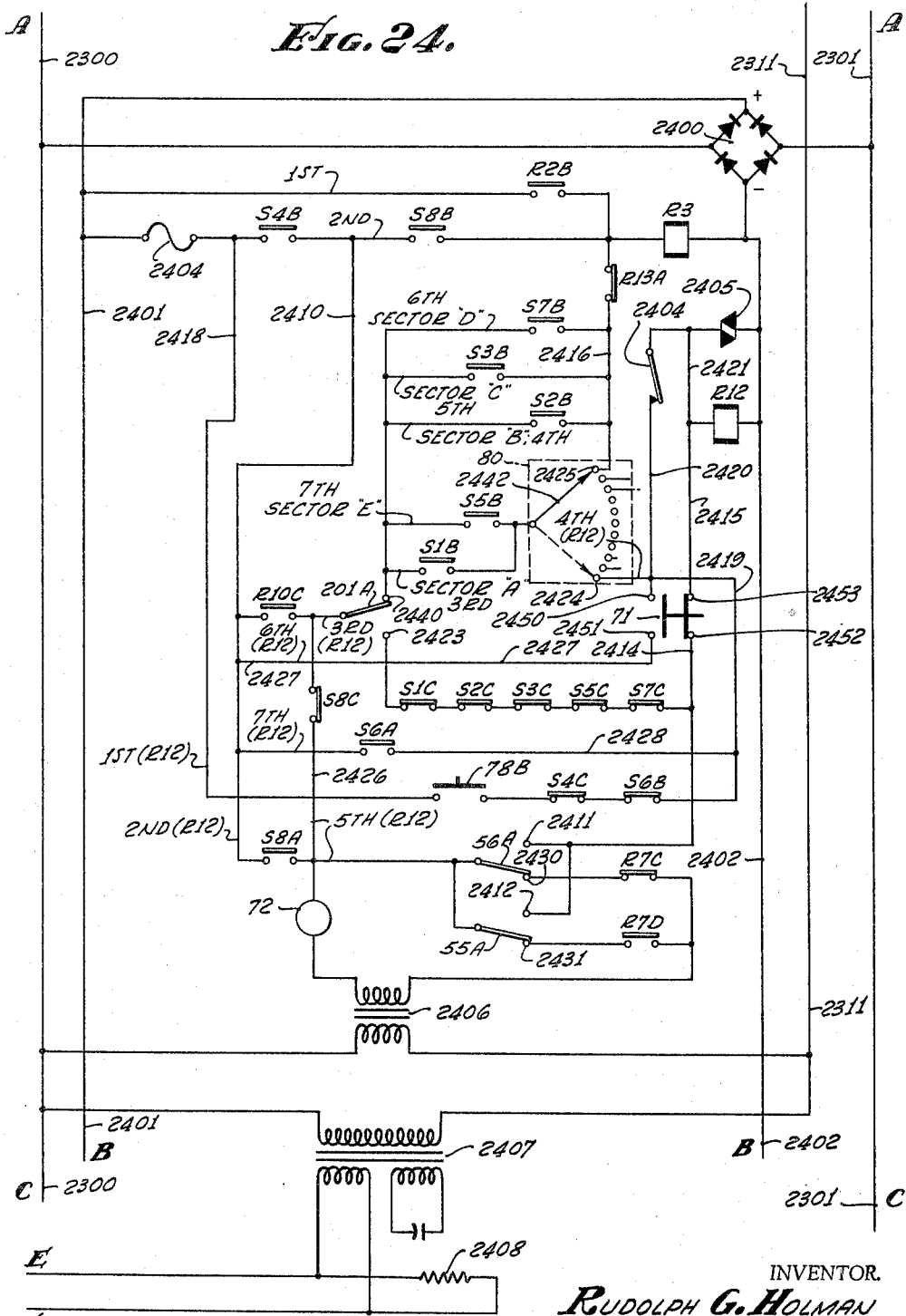

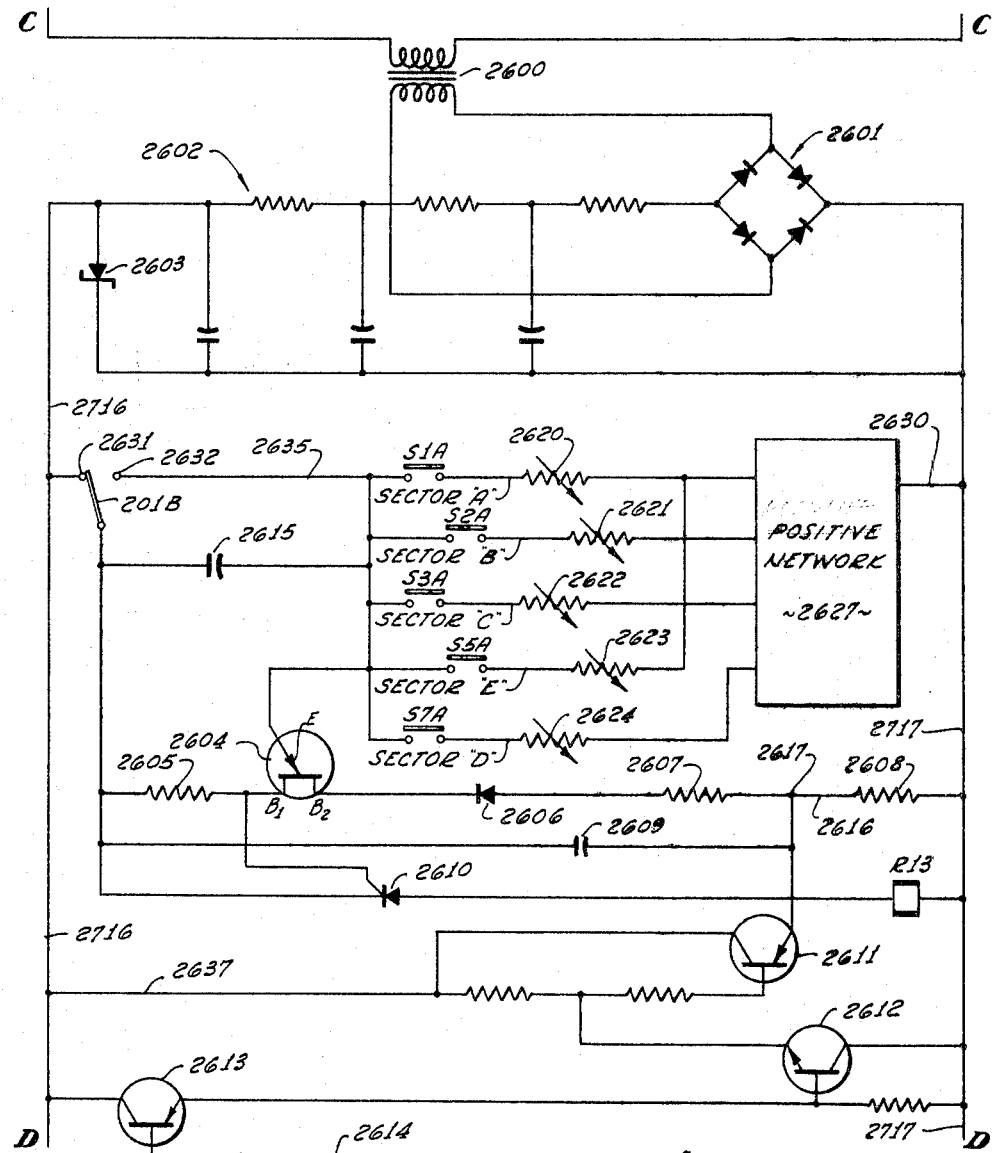
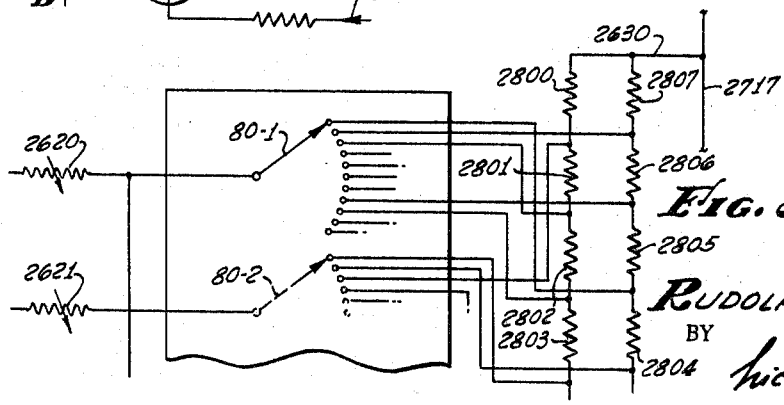
Fig. 26.
Fig. 28.
INVENTOR.
RUDOLPH G. HOLMAN
BY
Nicholas T Vohr
ATTORNEY.

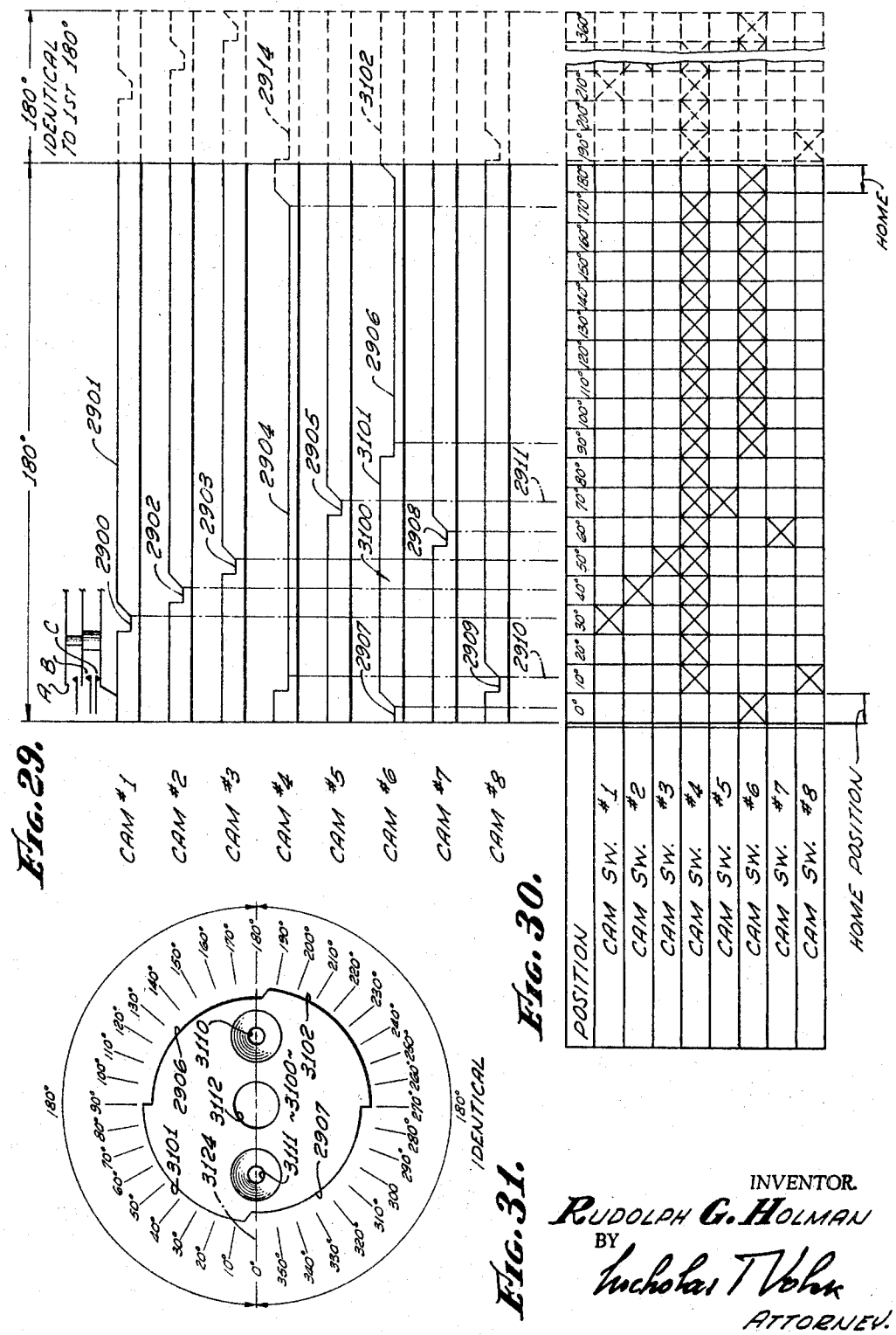

United States Patent Office 3,264,162
Patented August 2, 1966

3,264,162
RIBBON WINDING MACHINE WITH
INDEXABLE HUBS
Rudolph G. Holman, Santa Ana, Calif., assignor to W. J.
Voit Rubber Corp., a corporation of California
Filed Apr. 18, 1963, Ser. No. 274,005
6 Claims. (Cl. 156—397)

This invention relates to automated machines for winding elastomeric ribbon on pneumatic tire casings of new or old casings for depositing an external variable thickness, elastomeric layer along the crown and sidewall portions of the casing. This elastomeric layer is subsequently cured, or compression molded, to the casing for obtaining a casing-protecting, cured layer including two sidewalls, two shoulders and a crown. The two shoulders and the crown constitute the well-known tread of a finished pneumatic tire, the tread pattern being obtained during curing when the matrix of the mold imbeds itself in the heated elastomer.

The invention will be described first in connection with a machine which automatically deposits a variable thickness elastomeric layer on a green or cured casing of semi-toroidal shape and it then will be pointed out how the teachings of this invention are also applicable to the machines of the type in which the green casing has the shape of a hollow right cylinder which is mounted on a collapsible drum while the variable thickness layer is being applied to the outer surface of the casing. After the elastomer has been applied to the casing, the drum is collapsed, the casing, still shaped as a cylinder, is transferred to a toroidally shaped mold and a matrix where it is reshaped into a finished and fully cured toroidally shaped tire. The only difference that exists between the two machines, the one for toroidally shaped casing and the other for the cylindrically shaped casing is that in the first case the "azimuth" movement is circular and it is linear in the second case.

According to this invention, a relatively thin, flat ribbon having substantially rectangular cross-section with two rounded-off corners of natural or synthetic rubber, or a combination of the two, or other elastomeric material, is wound in a spiral form on top of the casing. The ribbon is extruded by a local extruder, which constitutes a part of the machine. The ribbon is wound at a predetermined and controllable amount of azimuth movement for each spin revolution of the casing. If the casing is an old casing and winding of the ribbon is for retreading the casing, then the old casing is first buffed to remove the outer worn and oxidized layer of the elastomer and then preferably coated with cement. At the beginning of the automatic winding process, the free end of the locally extruded, hot, tacky and very pliable ribbon, which, upon its extrusion has a temperature between 150° F. and 250° F., is manually secured by adhesion to a sidewall of the casing at a point located along one edge of the desired layer to be deposited on the casing. This is the only manual step in the process. From then on the winding is continued under the control of an electronic programmer until a predictable and the desired variable thickness layer of uncured elastomer has been automatically applied to the buffed surface of the tire. The variable thickness layer is obtained by winding, as it will be called here, a "composite spiral" on the casing. The nature of this composite spiral will become more apparent from a later, more detailed description of this spiral in connection with the drawings.

It is an object of this invention to provide a machine for winding an elastomeric ribbon on a large variety of tires, of small as well as large diameter.

It is an additional object of this invention to provide a programmer for the machine of the above type which can be selectively operated for depositing either a wide or a narrow layer of elastomer on a tire casing.

Still another object of this invention is to provide a programmer which has means for scanning a program card, having at least two scales used for controlling the programmer, and for operating the machine at two different azimuth speeds.

It is an additional object of this invention to provide a machine having motorized means for obtaining the desired azimuth radius.

It is also an object of this invention to provide automatic means for positioning the casing into the so-called azimuth and spin start positions.

Referring to the drawings,

FIGURE 1 is a transverse sectional view of a tire casing and of a mold surrounding the casing;

FIGURE 2 is a transverse sectional view of a tire casing and of a variable thickness elastomeric layer deposited on the casing;

FIGURE 3 is a plan view of a portion of the layer illustrated in FIG. 2;

FIGURE 5 is a plan view of the card-reading mechanism taken in the plane and direction of arrows 5—5 shown in FIG. 4;

FIGURE 6 is a side view of the azimuth shaft and four pulleys mounted on the azimuth shaft;

FIGURE 7 is a side view, partly in section, of a control panel and of the card-reading mechanism taken in a transverse plane indicated by line 7—7 and direction of arrows 7—7 shown in FIG. 4;

FIGURE 9 is a top plan view of the machine and of the stitcher guide assembly;

FIGURE 10 is a side view of the stitcher guide assembly;

FIGURE 11 is a tranverse section of the stitcher guide assembly taken in a plane of line 11—11 shown in FIG. 10;

FIGURE 12 is a plan view of a program card used for controlling the electronic programmer;

FIGURE 13 is a transverse section of an indentation produced on a card of FIG. 12;

FIGURES 15 and 16 are two side views of the upper end of the upright azimuth arm;

FIGURE 17 is a side view, partly in section, of a rotatable turret, indexing plate and spin motor mounting means;

FIGURE 18 is a plan view of the turret;

FIGURE 19 is a side view, partly in section, of the turret;

FIGURE 20 is a schematic diagram of compressed air connection of the machine;

FIGURE 21 illustrates the relationship of FIGURES 22–27 with respect to each other;

FIGURES 22–28 are schematic diagrams of the programmer controlling the operation of the machine;

FIGURE 29 is a developed view of eight cams of the stepping switch;

FIGURE 30 is a table illustrating the sequence of operation of the stepping switch;

FIGURE 31 is a side view of a cam used in a stepping switch;

FIGURES 32 and 33 are two views of contacts operated by a cam of the stepping switch;

Figure 4:
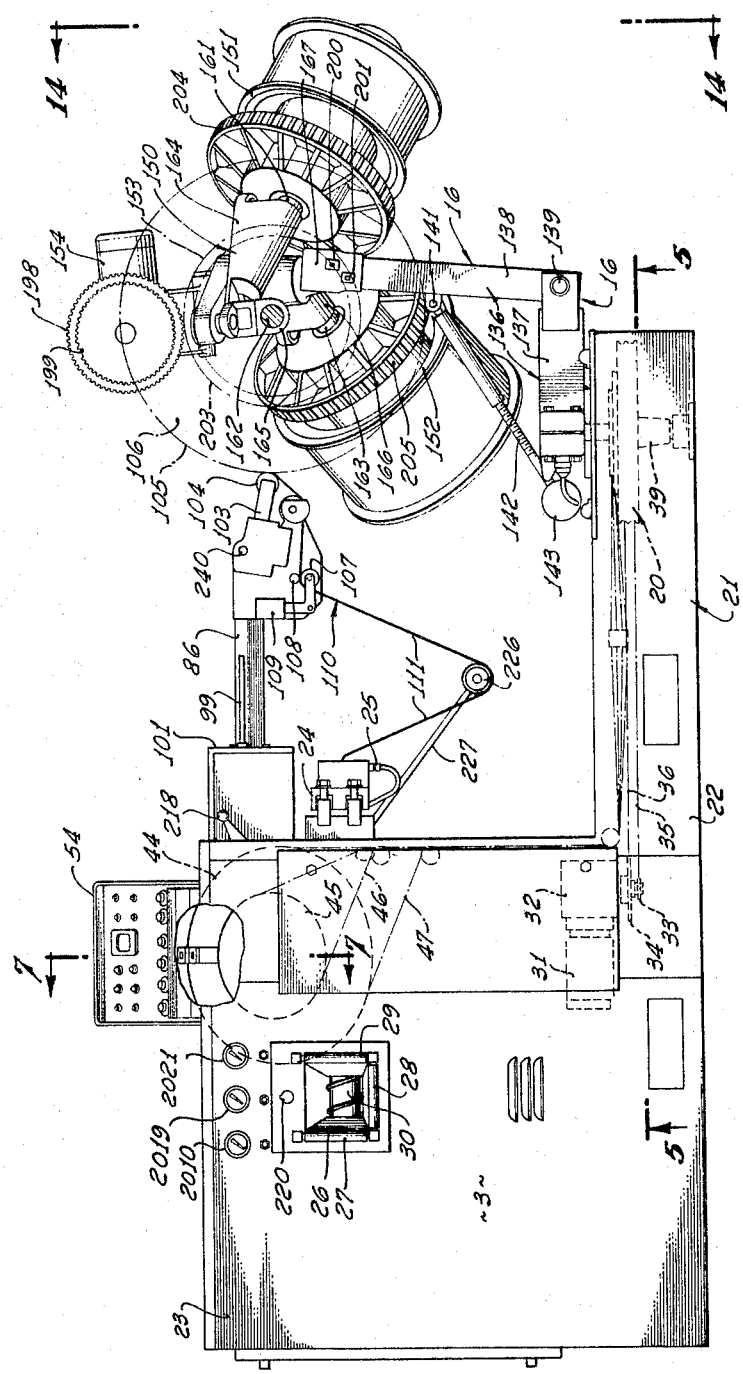
FIGURE 4 is a side view of the machine.

Referring to FIG. 1, it illustrates the cross-sectional view of a tire casing 1 with a variable thickness elastomeric layer 2 applied to the upper portion of the casing. The electronic programmer used for depositing layer 2 on the casing electronically subdivides the casing into five sectors A–E. In the illustrated example the deposited layer also includes two beauty rings 3 and 4. The ribbon subtends a variable angle α with adjacent outer surface of the casing and adjacent turns of the ribbon overlap each other to a variable extent which may vary from 5% to 100% overlap. In the latter case the turns are superimposed on top of each other. The minimum overlap of 5% is at the sidewalls where the thickness of the deposited layer is minimum.

FIGURE 2 illustrates the same layer 2 applied to casing 1 with the casing being in a form of a straight cylindrical casing rather than semi-toroidal as the casing illustrated in FIG. 1. Again, the casing is subdivided into five sectors A–E.

FIGURE 3 illustrates a plan view of a portion of the winding illustrated in FIGS. 1 and 2 and taken off the casing and placed in a single plane. The portion of the layer illustrated in FIG. 3 may subtend a sector in the order of 120°–160° when wrapped around the casing. Examination of FIG. 3 illustrates the fact that while lines $F_1, F_2, F_3 \ldots F_r$ are lines which are perpendicular to line 5, lines $H_1, H_2, H_3, H_4 \ldots O_3$ form an angle θ with line 5 which is less than 90°. This is due to the fact that there is an azimuth movement between lines 5 and 6 while the ribbon is being wound on sidewalls No. 1 and No. 2, and also, the azimuth movement between line 5 and lines 7, 8 and 9 during the winding of the ribbon along sectors B, C, D and E. All of the lines $G_1, G_2, G_3, G_n, L_1, L_2, L_3, L_{12}, L_n, M_1, M_2, M_n, O_1, O_2$, and $O_3$ are all parallel to each other and parallel to lines $H_1, H_2, H_3$ and $H_4$ because the azimuth movement is a constant rate movement, and if the rate of the spin motor is constant, which is generally the case, then all of the above lines will be parallel to each other. The distance between line 5 and lines 6, 7, 8 and 9, however, is different because of the fact that the duration of the azimuth movement varies from sector to sector. This interval of time is shortest in sector D because the distance between line 5 and line 9 is the shortest. It is followed by the next slightly longer time interval corresponding to a somewhat longer distance between line 5 and line 7, then a still longer interval of time represented by line 8, and finally, the longest period represented by line 6. In view of what is illustrated in FIG. 3, the azimuth movement in the illustrated system is a start-stop movement, and the sectors subtended by azimuth movement may vary, say from 30° up to 120°. It is desirable to have the sectors during which the azimuth movement takes place reasonably large, or long, so as to make angle θ as small as possible, and thus prevent the distortion of ribbon 110 when this ribbon becomes radially slightly displaced when azimuth movement begins at line 5. It is to be noted that the azimuth movement begins at the same instant during each spin revolution in accordance with the programming obtained with the aid of an electronic programmer which will be described later.

Referring now to FIG. 4, it illustrates the side view of the ribbon winding machine for winding the elastomeric ribbon 110 around a tire casing 106. The machine includes a frame 21 which includes a lower, rectangular box 22 and a higher rectangular box 23. Box 23 houses a water cooled extruder which terminates in a die member 24, the temperature of which is controlled by means of electrical heater elements 25. Box 23 is also provided with a hopper 26 which includes three rollers 27, 28 and 29 which facilitate feeding of the raw stock elastomeric ribbon into the extruder. This ribbon may be in the order of from 3″–4″ wide and ⅛″–½″ thick. A portion of the extruder screw 30 is visible through the open portion of hopper 26. Box 23 also houses an azimuth motor 31, an azimuth motor gear reduction box 32, two azimuth motor pulleys of different diameter 33 and 34, two chain drives 35 and 36 connected to a single azimuth pulley 20 which is mounted directly on an azimuth shaft 39. Azimuth shaft 39 is mounted in bearings 40 and 41 supported by the frame. Pulley 20 has two smooth circumferential grooves 37 and 38 which engage sprocket chains 35 and 36. Sprocket chains 35 and 36 are used to drive pulley 20 either by means of sprocket wheel 33 and chain 35 or sprocket wheel 34 and chain 36. Such two-speed drive is obtained by tightening either chain 35 or 36 by energizing either an actuator 113 or 112, as will be explained later. Since the two faces 37 and 38 of pulley 20 have equal diameters, the two speed ratios depend solely on the diameters of the sprockets 33 and 34. Pulley 20 also has two additional wire cable grooves 42 or pulleys 42 and 43 of different diameters, which are an integral part of pulley 20. Large pulley 43 drives small pulley 45 and switch 55 through cable 46 and small pulley 42 drives large pulley 44 and switch 56 through cable 47, as illustrated in FIGS. 4, 5 and 6. Pulleys 44 and 45, having ball bearings, such as ball bearing 67, are mounted on a stationary axle 63 supported by the frame members 64, 65 and 66. Pulleys 44 and 45 and their radius arms 48 and 49 rotate at two different angular velocities. Arms 48 and 49 are provided with rollers 50 and 51 engaging the arcuate rails 52 and 53 on a frame 54. Also mounted on arms 48 and 49 are two microswitches 55 and 56 which are used for reading a card 60. Arm 49 and its switch 55 rotate approximately twice as fast as arm 48 and its switch 56 because of the difference in the diameters of the driving and driven pulleys. Higher step-down on chain drives is somewhat neutralized by the step-up of the cable drives. Card 60 contains information which is used for proper starting of the machine and subdividing the casing into sectors A–E. This card also has information for automatically stopping the machine at the completion of the ribbon winding cycle. Card 60 is held in tight engagement with frame 54 by means of a hinged card holding plate 61 and by means of a coil spring 62.

Figure 8:
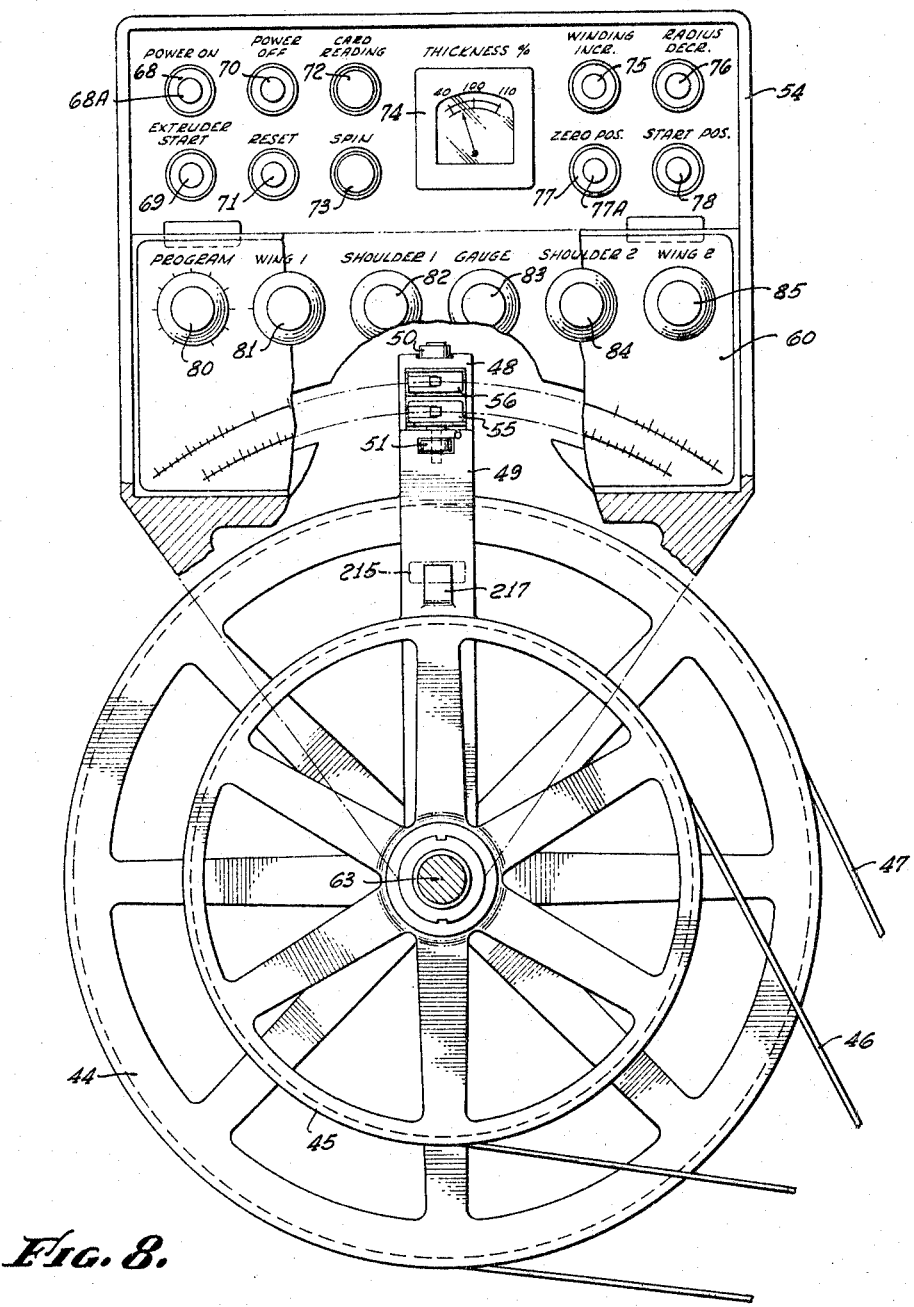
FIGURE 8 is a plan view of a control panel and of the card reading mechanism.

FIG. 8 illustrates the face of frame 54, supporting card 60, wheels, or pulleys, 44 and 45, the radius arm 49 and 48, the microswitches 55 and 56, card 60 and a plurality of push buttons and rheostat knobs. Push button 68 is a "power on" push button. Push button 69 is an "extruder start" push button. Push button 70 is a "power off" button and is used in emergencies for immediate stopping of the entire machine. Push button 71 is a "reset" push button used for resetting a stepping switch which is a part of the programmer. The stepping switch acts as a sequencing device within the programmer. Light 72 is a card-reading light and becomes momentarily extinguished when either card-reading switch 55 or card-reading switch 56 becomes actuated upon encountering a detent on the scale of the card. This will be described more in detail later. The second light is light 73 which also becomes momentarily extinguished when a spin switch becomes momentarily closed at the time the wheel, or the hub, supporting the casing passes through a specific angular position on the spin axle. There are two spin switches of this type in the programmer and they will be described more in detail in connection with the description of the schematic diagram of the programmer. The panel also includes a meter 74 which is a voltmeter calibrated to read directly the percentage of thickness of ribbon 110 used for depositing the variable thickness layer on the casing. Push button 75 is used for increasing the azimuth radius. Push button 76 is used for decreasing the azimuth radius. Push button 77 is used for operating the azimuth motor 31 so as to position the casing and the azimuth shaft 39 into the so-called zero azimuth position, which is the position at which the casing lies in the plane passing through the longitudinal axis of the machine and the longitudinal axis of the stitcher arm. This also will be described more in detail later. Push button 78 is the button which is used for simultaneously positioning the casing into two starting positions. The first one is the starting spin position which rotates the casing into the specific angular position with respect to the spin axis, called here the starting spin position, and the second starting position is the starting azimuth position, which is a predetermined angular position of the azimuth shaft 39 with respect to the longitudinal axis of the machine and of the stitching arm. Panel 54 also includes six knobs 80, 81, 82, 83, 84 and 85. Knob 80 is a program selecting knob which selects simultaneously either microswitch 54 or microswitch 55 for actuating the programmer, the chain drive for the selected switch, and also selects the fixed resistors used in the timing circuit of the programmer. All of the above will be described more in detail in connection with the description of the programmer. The remaining five knobs 81–85 are the knobs which adjust the resistors (rheostats) in the five parallel, selectable timing circuits used for timing the intervals of time during which the azimuth motor 31 rotates azimuth shaft 39 in five sectors A through E. This period of time can be made either longer or shorter in any given sector A–E, knob 81 being for adjusting the interval of time in sector A, knob 82 for adjusting the time interval in sector C and knob 84 for adjusting the time interval in sector D, and knob 85 for adjusting the time interval in sector B. These sectors are marked on card 60 as "wing 1" (sidewall No. 1), "shoulder 1," "gauge," "shoulder 2" and "wing 2" (sidewall No. 2). The central knob 83, therefore, is for adjusting the "gauge," or the thickness, of the elastomeric layer deposited on the crown of the tire. Tire men have special "gauges" for measuring this thickness; hence the reason for the term.

FIGURES 9, 10 and 11 illustrate the plan view, side view and cross-sectional view, respectively, of a stitcher arm 86. FIGURE 9 also illustrates the plan view of the machine. The stitcher arm 86 is a hollow, rectangular arm rotatably supported by four rollers 87, 88, 89 and 90, which, in turn, are supported by the walls of box 23 with the aid of structural members such as 91, 92, 93 and 94. The azimuth arm 86 also has a metallic plate 95 welded to it, and this metallic plate is used for pushing the azimuth arm 86 forward with the aid of the pneumatic actuator 96, which includes a cylinder 97 bolted to the frame member 93, and a push rod 98 which is shown in its outward, extended position in FIG. 10. Actuator 96 also exerts a suitable pressure on the stitcher after the stitcher engages the casing. The azimuth arm also has a scale 99 permanently attached to the arm and a scale reader 100 mounted on the wall 101 of box 23. Scale 99 is used for indicating the azimuth radius in the manner which will be described later. The outer end of the azimuth arm also includes a stitcher 102 having a plurality of spring loaded stitching arms 103 and stitcher rollers 104 which are used for stitching the ribbon to a surface 105 of a casing 106, which is indicated by dotted lines in FIG. 4. The outer end of the stitcher arm 86 also includes an idler roller 107 and a ribbon thickness gauging roller 108 which rests on top of roller 107 and is connected to a transducer 109 which constantly gauges the thickness of the ribbon and produces an electrical signal proportional to the thickness of ribbon 110. This signal is used in the programmer for combining this signal with other signals generated in the programmer for timing the duration of the azimuth rotation. Although the thickness of the ribbon, as a rule, remains quite constant, nevertheless, at times there may be some variation in the thickness of ribbon 110. Since this thickness of the ribbon affects the thickness of the deposited elastomeric layer on casing 106, it becomes necessary to furnish the electrical signal corresponding to this thickness to the programmer and in this manner the programmer takes into consideration any variation in the thickness of the ribbon.

Because the stitcher is mounted in the offset position within the frame of the machine, for purely structural reasons, this vertical plane is parallel to the longitudinal axis of the stitcher arm. This vertical plane, therefore, also passes through the centers "O" and line 15 indicated in FIG. 1.

As also illustrated in FIG. 9, the stitcher is positioned so that it engages the center of casing 106 when the casing is in the 0° azimuth position, as indicated in a protractor 18 and a pointer 17 attached to the horizontal radius arm 137 of the azimuth column 16 mounted on the azimuth shaft 39. At 0° reading, the casing 106 lies in the vertical plane passing through the center of the stitcher, through the center of the azimuth shaft 39 and through the longitudinal axis of the extruder.

Referring now to FIGS. 1, 5, 6, 7 and 8, these figures illustrate the various connections between the azimuth motor 31, the azimuth shaft 39 and the two microswitches 55 and 56 which scan the program card 60. As mentioned previously, azimuth motor 31, FIGS. 1 and 5, is connected to the azimuth pulley 20 by means of two sprocket chains 35 and 36 and two smooth face pulley grooves 37 and 38 which are keyed to the azimuth shaft 39. Since pulley 20 comprises one single element keyed to shaft 39, all of its elements 37, 38, 42 and 43 rotate at the time as a single piece as long as the azimuth motor 31 is in operation and is connected to pulley 20 either through sprocket 34 or sprocket 33. Two sprockets and two chains are used to rotate pulley 20 at two different speeds. The low speed is used for truck tires (top cap) requiring large A turning radius in the order of 14", the higher speed is used for passenger tires (full cap) requiring turning radius in the order of 4". This is described more in detail below. In order to achieve this, two air operated actuators on the upper wall 111 of box 22 and these actuators are provided with push rods 114 and 115 and sprocket wheels 116 and 117 which engage their respective chains in the manner illustrated in FIG. 5. The sprocket wheels 116 and 117 are held in a light pressure engagement with the sprocket chains 35 and 36 by means of two tension springs 118 and 119. Springs 118 and 119 are used solely for the purpose of maintaining the sprocket wheels 116 and 117 in constant proper engagement with their respective chains 35 and 36. Springs 118 and 119 are not strong enough to prevent sliding of chains 35 and 36 over the faces 37 and 38 of pulley 20. Therefore, normally, in the neutral position, both chains 35 and 36 engage their sprocket wheels 116 and 117 and the smooth faces 37 and 38 of pulley 20, but are not capable of rotating pulley 20 because both chains are free to slide over the smooth faces 37 and 38 of pulley 20. Either actuator 112 or actuator 113 is energized by the programmer by means of solenoid operated valves V1 and V2, shown in FIG. 23, with the result that either push rod 115 or push rod 114, pushed by the actuator toward the chain, is subjected to a high pressure exerted by the actuator, with the result that either chain 35 or chain 36 engages pulley 20 and groove 37 or 38 so that pulley 20 is then turned by the azimuth motor 31. If one of the actuators 112 or 113 is energized but the azimuth motor is de-energized, then one of the chains 35 or 36 holds pulley 20, the azimuth shaft 39 and the entire azimuth column 16 in a fixed, "locked" position and prevents it from being manually rotated. This locking of the azimuth column 16 is obtained by means of gear box 32 which, because of the high gear ratio, cannot be rotated manually by exerting a pressure on column 16 as long as one of the chains "locks" the azimuth shaft 39 to the gear box 32. The net result of the above arrangement is that firstly, shaft 39 can be rotated by the azimuth motor 31 at two different speeds. Secondly, the azimuth column can be locked in a predetermined angular position.

Two azimuth speeds are used to obtain two speeds of rotation for the azimuth shaft 39 and also to rotate the card reading switches at two angular velocities for obtaining two different "resolving powers" on two different angular scales illustrated in FIG. 12.

In one specific example the high speed of the azimuth shaft 39 is 3.1 revolutions per minute while the low speed is .78 revolution per minute. The high speed is used for retreading passenger tires with a full cap and the low speed is used for recapping truck tires with only a top cap. It may be remembered that the thickness of the deposited layer is a function of the unit azimuth displacement per unit of spin displacement (pitch) and since the truck tires require a thick layer (very small pitch) of elastomer for their treads at a large turning radius, it becomes necessary to reduce the speed of the azimuth shaft 39 to .78 revolution per minute in order to obtain the desired thickness of the elastomeric layer. Since pulley 20 simultaneously rotates steel cables 46 and 47 with the aid of pulleys 42 and 43, wheels 45 and 44 also rotate simultaneously but at different angular velocities. This also means that the scanning arms 49 and 48 and switches 55 and 56 also rotate at the same time at two angular velocities with arm 49 and switch 55 rotating approximately twice as fast as arm 48 and switch 56. However, only one switch, either switch 55 or switch 56, controls the programmer at any given time because, as illustrated in FIG. 12, card 60 has indentations 120–125 only on one scale at any given time while the second scale has no indentations. In FIG. 12 it is scale 126 that has six indentations and scale 127 has none; therefore, even though switch 55 scans scale 127 while switch 56 scans scale 126, it is only switch 56 that will generate electrical signals which are transmitted to the programmer to control the programmer and light light 72 every time roller 128 of switch 56 encounters one of the indentations 120–125 and closes the contacts of the current reading switch 56. The shape of the indentations is illustrated on an enlarged scale at 130 in FIG. 13. Roller 129, on the other hand, will control the programmer when the indentations appear on scale 127 and then there are no indentations on scale 126.

Two speeds of the azimuth shaft rotation and two scales are used on card 60 so as to enable one to produce a higher resolution of the angular rotation of the azimuth shaft 39 on card 60 for a relatively small angular rotation of azimuth shaft 39. As mentioned previously, scale 127 is used for obtaining proper control of the programmer for recapping truck tires and scale 126 is used for retreading passenger tires. As indicated in FIG. 12 by the indentations 120–125, the rotation of the azimuth shaft 39 is in the order of 90° and it is only in the order of 40° in the case of a truck tire, in which case the "top cap" indentations on scale 127 appear at 131, 132, 133 and 134, the exact readings at one particular instance being 19°, 16.2°, 14°, 19°. The magnification obtained on scale 127 as compared to scale 126 is slightly more than two to one since 30° on scale 127 correspond approximately to 70° on scale 126.

Referring now to FIGS. 4 and 9, the azimuth shaft 39 supports the azimuth column 136 which has a horizontal arm 137 mounted on azimuth shaft 39 and a vertical column 318 which is pivotally mounted on the horizontal arm 137. Arm 137 is an L-shaped arm and a pivot 139 is mounted on one end of the L-arm which supports the upright arm 138 while the other end of the L-shaped arm 137 is supported by the azimuth shaft 39. The angular position of the upright arm 138 is made adjustable by means of a threaded sleeve 140 which is connected to arm 138 by means of a pivot 141 and a rotatable screw, or threaded stud, 142. Screw 142 is rotated by means of an azimuth radius motor 143 which is also mounted on the L-shaped arm 137. Power is supplied to motor 143 through a lead 144 which passes through the central hollow portion of azimuth shaft 39 in the manner not illustrated in any of the figures. It is this motor 143, which is a reversible direct current motor, that is operated by manually actuating either push button 75 or push button 76 so as to make motor 143 rotate either in one or the opposite direction, thus either increasing or decreasing the length of the link 140–142 and thus either increase or decrease the azimuth radius, which is the radius R appearing in FIG. 1. It is the distance from the center "O" to the outer surface of the carcass. This radius should be made equal to the distance between point 0 and point 145 on the casing. The magnitude of this radius is given at 146 on card 60, and this adjustment of the azimuth radius is obtained by first moving the azimuth column in the 0° position so that casing 106 is aligned with the stitcher arm 86 and then moving stitcher arm 86 into contact with the outer surface 105 of the casing. The radius arm reading then will appear directly on scale 99 and this azimuth radius can be made either larger or smaller by operating motor 143 with the aid of the push buttons 75 and 76 until the reading, appearing on scale 99, corresponds to that appearing on card 60.

Referring now to FIGS. 1, 15, 16, 17, 18 and 19, they illustrate a rotatable turret which can be positioned into three different positions so as to place one of the three expandable hubs into the operating position, i.e., the position places one axis of one hub into a horizontal position which enables one to mount the casing on the hub. Three hubs of different size are provided in order to mount different size tires on different hubs. One hub has an expansion range from 13" to 16", the second hub has a range from 16" to 22.5", and the third hub has a range from 20" to 24.5". Only two hubs are illustrated in solid lines in FIG. 4 and the third hub is illustrated only in dotted lines so as to illustrate more clearly the structural features of a turret 150 and other additional elements.

Figure 14:
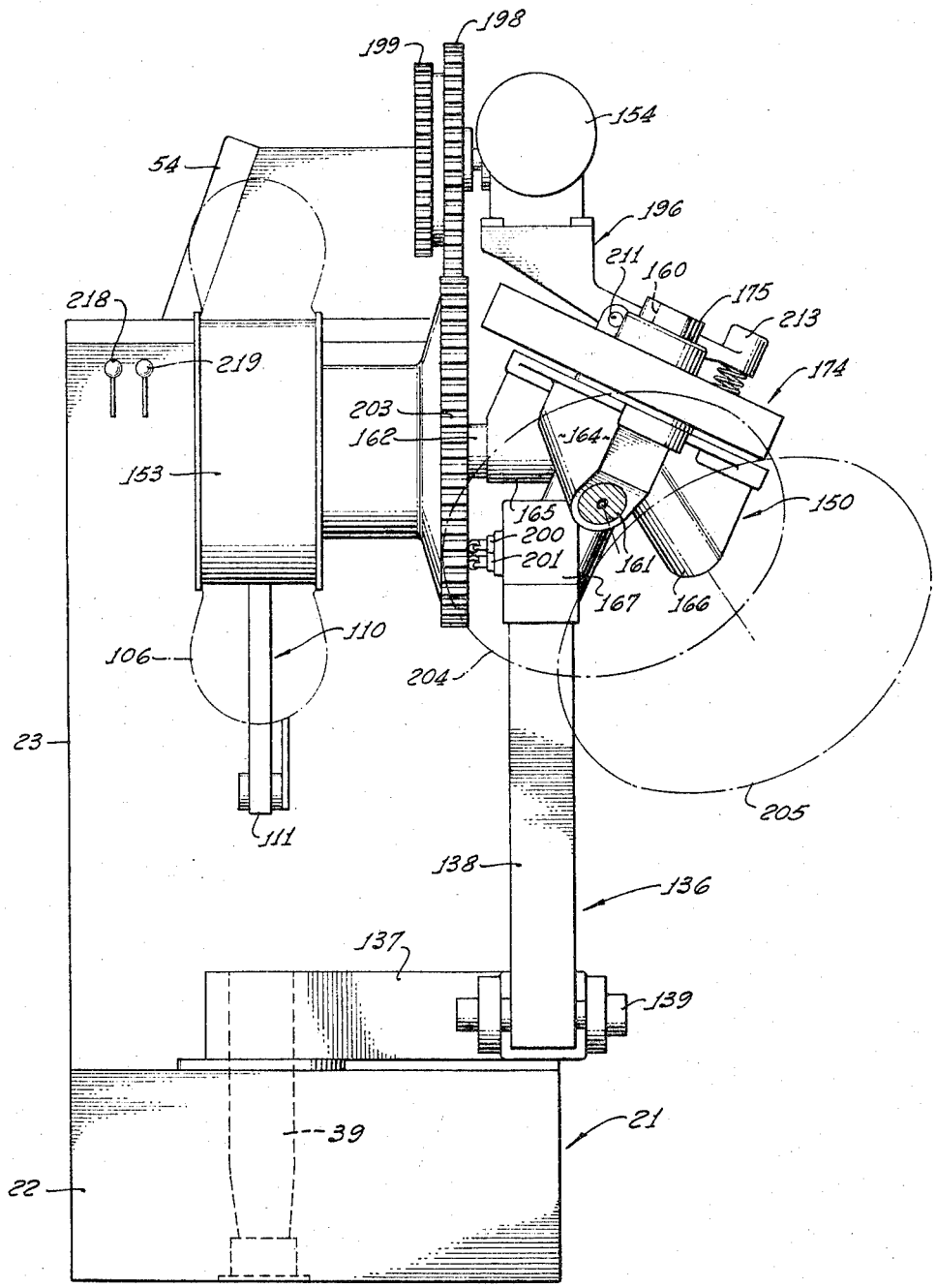
FIGURE 14 is an end view of the machine and of the azimuth column, taken in the direction of arrows 14—14, illustrated in FIG. 4, with the expandable hubs, or mandrels, not being shown in the drawing for a clearer prepresentation of the azimuth column.

Before proceeding with a detailed description of the azimuth column 16, it will be helpful here to state briefly the upper part of the column includes a mandrel 150, an indexing plate 174 and a rocking plate 196, best shown in FIG. 17, which comprise a hub selecting and indexing mechanism of the machine. All of these elements are used to position any one of the three available expandable hubs 151, 152 or 153, having different diameters for mounting different size tires, into the operating position which is the position of hub 153 in FIGS. 1 and 14. In this operating position the rotational axle of the hub is in the horizontal position, as also shown in FIG. 14, and, therefore, it becomes possible to mount a casing on this hub and then proceed with the normal operation of the machine. In the above process it becomes necessary first to unlock the mandrel holding the three hubs for rotation, then index it in proper angular position, then lock it again after the desired hub has been indexed into the operating position. It is also necessary to unlock or decouple the gears and the spin motor from the hub prior to the turning of the mandrel and then couple another set of gears to each other and to the spin motor upon completion of indexing. The gear ratio between the three hubs and the spin motor does not remain constant from hub-to-hub, but it changes: the number of revolutions per minute of the largest expandable hub is lower than the r.p.m.'s of the smallest hub. Therefore, two driving gears of different diameter are provided on the countershaft driven by the spin motor and one of these gears is coupled to and decoupled from the driven gear of the desired diameter and gear ratio which constitutes an integral part of the expandable hub. In this manner the three hubs having the minimum diameters of 13", 16" and 20" are normally driven at the following respective maximum rates by the variable speed D.C. motor: 18 r.p.m.; 12 r.p.m. and 12 r.p.m.

Proceeding now with the more detailed description of the hub selecting and indexing mechanism, mandrel 150 is rotatively mounted on the upper, tilted hollow axle 160, which is welded to the upright column 138, together with a rectangular outlet box 167, which constitutes an integral part of the axle. Box 167 is used for mounting two spin switches 200 and 201, and three compressed air conduits with three different air pressures used first, for inflating casings, second for expanding the hubs and the third one is for operating an actuator in an indexing head 174. Conductors leading to the spin motor 154 also pass through box 167 and the hollow axle 160. Axle 160 forms a 25° angle with the longitudinal axis 161 of arm 138a in the first plane, which is the plane of the drawing in FIGS. 15 and 14, and a 10° angle in the second plane, also the plane of the drawing in FIG. 16, which is at 90° with respect to the first plane. These angles are illustrated in FIGS. 15 and 16. The plane of the drawing in FIG. 15, which is the first plane, is at right angles to the longitudinal axis of the machine and the longitudinal axis of the stitcher arm when the azimuth column is in its 0° position, which is the position illustrated in FIGS. 1 and 14. The mandrel 150 includes three non-rotatable axles, 161, 162 and 163 which project outwardly from the three hubs 164, 165 and 166. The three hubs constitute an integral part of mandrel 150 and the longitudinal axes of these hubs from an angle of 65°.20″ with respect to the rotational axis 168 of the hub, which is also the longitudinal axis of axle 160.

The projecting axles 161, 162 and 163 are held in fixed position with respect to mandrel 150 by means of pins 170, which project into the hub, as well as into the respective axles. The expandable hubs 151, 152 and 153 are then mounted on, and laterally fixed on the projecting axles 162, 163 and 161 and are free to rotate around the aboxe axles as long as they are not connected to the spin motor 154 and gear box 197. Mandrel 150 is also provided with three indexing orifices 171, 172 and 173 which are used for holding the mandrel in a fixed position with respect to an indexing head 174, which is fixedly mounted on the upper end of axle 160. The indexing head 174 is provided with a hub 175 and a pin 176, which passes through hub 175 and axle 160, thus rigidly connecting the indexing head 174 to axle 160. The indexing head 174 is provided with a bore 177 which is used for mounting an indexing ball 178 in bore 177. The indexing ball is held in outwardly projecting position by means of a compression spring 179 and a plate 180, which is screwed to the upper face of plate 174 by means of a plurality of studs, such as studs 181 and 182. Bore 177 is provided with a ball seat 183 at its lower end, which holds ball 178 in proper position in head 174. Mandrel 150 and its orifices 171, 172 and 173 are also provided with three bushings, such as bushings 184 and 185, and these bushings are also provided with seats 186 which match the spherical surface of ball 178 in the manner illustrated in FIG. 17. Mandrel 150 can thus be positioned in proper and very precise angular position with respect to the azimuth column when ball 178 engages and clicks into the seat 186 of that bushing which is placed in proper alignment with ball 178. The mandrel 150 and the indexing head 174 are also provided with an actuator for interlocking the mandrel and the head with respect to each other by operating a manually actuated four-way valve 187, which is provided with a handle 188. The valve is connected to a source of compressed air by a flexible hose 189 and two hoses 190 and 191 connect this valve and the compressed air with a cylinder 192. A piston 193 is slidingly mounted in cylinder 192 and is made to travel, by the operator, either up or down along the length of cylinder 192 when he actuates handle 188 of the three-way valve 187. Piston 193 is fixedly connected to locking pin 194, which projects into a bushing 185 when hub 150 and the indexing head 174 are locked to each other by means of pin 194. At this time piston 193 is in its lower position illustrated in FIG. 17. When the indexing head 174 and hub 150 are in such interlocked position, one of the expandable hubs 151 or 152 or 153 is in the right position for mounting the casing and for winding the ribbon on the casing, at which time the axle of such hub, such as axle 162 in FIG. 4, is in the horizontal position, which is also the position illustrated in FIG. 14. The interlocking pin 194 performs an additional function: when piston 193 travels to its upward position in FIG. 17, and the interlocking pin 194 leaves bushing 185, the upper end 195 of pin 194 strikes the bottom surface of the rocking plate 196 which supports the spin motor 154 and its gear box 197. Two rotatable gears, 198 and 199 are mounted on counter shaft 200, which is projecting beyond gear box 197. The gears 198 and 199 engage gears 203 and 204. It is to be understood that only one driving gear, either gear 198 or gear 199, engages at any given time its corresponding driven gear 203 or 205 and, therefore, only one expandable hub, and one carcass mounted on this hub, is rotated around its spin axis by the spin motor 154. Since the driving gears 198 and 199 engage their respective driven gears, whenever such driven gear is positioned or indexed into the right angular positions so as to produce the engagement between the respective driven and driving gears, it becomes necessary to provide some means for engaging and disengaging these gears from each other and also for exerting pressure by the driving gear upon the driven gear, so as to obtain positive engagement between the two gears once they have engaged each other. To obtain the above, the spin motor 154 is mounted on the rocking plate 196, which supports the motor by means of studs 209 and 210 and additional two studs which are not visible in the drawing. The rocking plate 196 is pivotally mounted on a pivot 211 by means of a hub 212. One end of plate 196 is provided with a cup-shaped member 213 and a compression spring 214, which presses against the upper surface of the indexing head 174. It is spring 214 then that constantly presses either gear 198 or gear 199 into engagement with the driven gear and holds them in positive driving engagement with the corresponding gear mounted on the expandable hubs. In order to break this driving engagement between the driving and the driven gears at the time mandrel 150 is turned around its axle 160 so as to remove one expandable hub from the operating position and place another hub, of different expandable range, into the operating position, it becomes necessary to rotate the rocking plate 196 in the direction of an arrow 215. This is accomplished by means of the actuator, including cylinder 192 and piston 193 and pin 194.

As mentioned previously, the upper end 195 of pin 194 engages the bottom of the rocking plate 196 and tilts it to that position at which the bottom rim of cup 213 strikes a boss 216. In other words, plate 196 is rotated in the direction of the arrow 215. In this manner, the engagement between the driving and the driven gears is broken and the two gears are disengaged from each other, so as to free mandrel 150 for its rotation around its axle 160 for positioning any one of the three available hubs into the operating position on the azimuth column.

The functioning of the rotatable mandrel 150, of the indexing head 174 and of the rocking plate 196 is, therefore, as follows: It is assumed that one of the expandable hubs is in the operating position, which is always the case. It is the position illustrated in FIGS. 4 and 17, at which time ball 178 engages one of the seats 186 and pin 194, interlocks mandrel 150 and the indexing head 174. At this time, either gear 198 or gear 199 also engages a corresponding driven gear of the hub which happens to be in the operating position and spring 214 exerts sufficient pressure between the driving and the driven gears so as to keep them in proper driving relationship with respect to each other. It should be noted here also that in order to keep mandrel 150 and plate 174 in the interlocked position, positive pressure is exerted continuously by compressed air on the upper face of piston 193, and therefore, piston 193 is held in its lower position, which is that shown in FIG. 17. Therefore, pin 194 is continuously held in fully engaged position with bushing 185 with the aid of the positive air pressure. In order to remove one hub from the operating position and replace it with another expandable hub, the operator turns handle 188 in the right direction, with the result that positive pressure on the face 217 of the piston is released and this face of the piston becomes connected to ambient air pressure, while the opposite face of the piston becomes connected to the high pressure through hose 190. Therefore, piston 193 lifts pin 194 and simultaneously rocks the rocking plate 196 in the direction of arrow 215, at which time the operator is then ready and free to rotate mandrel 150. Immediately after ball 178 clicks into the proper seat in the succeeding bushing, the operator knows that mandrel 150 is in the proper angular position and that one of the expandable hubs has been indexed into the proper operation position. He then operates hand 188 of the four-way valve 187 once more, with the result that piston 193 is at once placed into its lower position and pin 194 interlocks against hub 150 with plate 174 and, at the same time, releases the rocking plate 196 from its lifted position. One of the gears 198 or 199 then engages a corresponding driven gear and thereafter, one of the desired expandable hubs becomes locked in its proper position on the azimuth column. The operator then is ready to place the tire casing on such hub and expand this sub by operating a three-way valve 218, FIG. 1, which establishes an air-tight connection between the hub and the casing. The operator then operates a second three-way valve 219 which inflates the tire. As a rule valves 218 and 219 are operated by the operator almost simultaneously so that the casing is properly expanded and allowed to slide with its two beads outwardly on the hub even prior to the establishment of the above-mentioned air-tight connection between the hub and the casing, which could otherwise prevent such outward sliding. Such simultaneous operation of the two valves thus enables one to expand the casing and its proper seating against the rims of the hub shoes 2016 and 2017 before the hub is fully expanded.

FIGURE 20 is a schematic diagram of the compressed air lines and connections used in the machine. Air, at a pressure which may be in the order of 150 pounds is supplied to the machine by means of line 2000, whereupon it passes through a filter 2001 and then a pipe 2002 supplies the compressed air to six parallel circuits 2003 through 2008, which are designated in FIG. 20 as follows: 2003 is the stitcher arm circuit; 2004 is the hub cylinder circuit; 2005 is the tire inflation circuit; 2006 is low speed azimuth drive circuit; 2007 is high speed azimuth drive circuit; and 2008 is turret locking circuit.

These circuits have been already described, to some extent, in connection with the description of the earlier figures.

The stitcher arm circuit 2003 includes a pressure regulator 2009, a pressure gauge 2010, which is mounted on a sidewall 3 of box 23, FIG. 1. The line then continues as line 2011 with the pressure in line 2011 being in the order of 70–80 pounds. A solenoid operated valve 2012 is connected in series with line 2011 and it is operated by the solenoid V3 which is a part of the programmer illustrated in FIG. 23, and therefore, its sequence of operation will be described later in connection with the description of the operating cycle of the programmer. Valve 2012 is connected in series with a flow control element 2013 and then with the stitcher cylinder 96, FIG. 9. The function of this circuit has already been described in connection with FIGS. 9 and 10. It is used to advance the stitcher arm 86 into its forward position and hold stitcher 102 at a constant pressure against the tire casing 106.

The next circuit is the circuit 2004 connected to the hub cylinder and is used for expanding the hub by supplying air to the hub cylinder 2014 and moving a piston 2015 within the hub cylinder which expands or moves in the radially outward direction a plurality of hub shoes, such as shoes 2016 and 2017, which engage the two beads of the tire casing and form an air-tight joint with the casing. The casing is then inflated with the aid of the tire inflating circuit 2005. The hub circuit also includes a pressure reducing regulator 2018, a gauge 2019 and a manually operated valve 218 which was described earlier in connection with the description of FIG. 1 and azimuth column 16. The pressure in a conduit 2026 should be in the order of 150–160 p.s.i.

The next circuit is circuit 2005 which is the tire inflation circuit. It includes a pressure reducing regulator 2020 and a pressure gauge 2021, a pressure relief valve 2022, the manually operated three-way valve 219 and a tire inflating outlet 2023. This circuit also has a frangible disc 2024 which is a safety device connecting conduit 2025 to ambient air in case, because of some malfunctioning of other elements in the circuit, the air pressure in conduit 2025 may exceed the maximum pressure for which it is designed. The normal pressure in conduit 2025 is in the order of 15–20 p.s.i. The tire inflation circuit also has an additional safety device which is a pressure relief valve 2027.

The fourth and fifth circuits 2006 and 2007 are the circuits for tightening either chain 35 or chain 36, previously described in connection with FIG. 5. These chains are connected through sprockets 33 and 34 to the azimuth motor 31 and are used for driving the azimuth shaft 39 and the azimuth pulley 20 at two different speeds. Solenoid valves V2 and V1 are used for operating the actuators 112 and 113 which are also shown in FIG. 5, these actuators tightening their respective chains 36 and 35 in the manner described previously.

The next circuit is the circuit for energizing the actuator illustrated and described in connection with the description of FIG. 17. It includes a four-way manually operated valve 187 which has also been described previously in the description of FIG. 17. This valve admits air to the actuator 192 and moves piston 193 and the locking pin 194 into its lower position, as seen in FIG. 17, for locking mandrel 150 against rotation; in its upper position the actuator lifts plate 196 and disengages the two drive gears 198 and 199 from the respective driven gears 203 and 204 connecting the hub, which has been indexed into the operating position to the spin motor 154.

Figure 23:
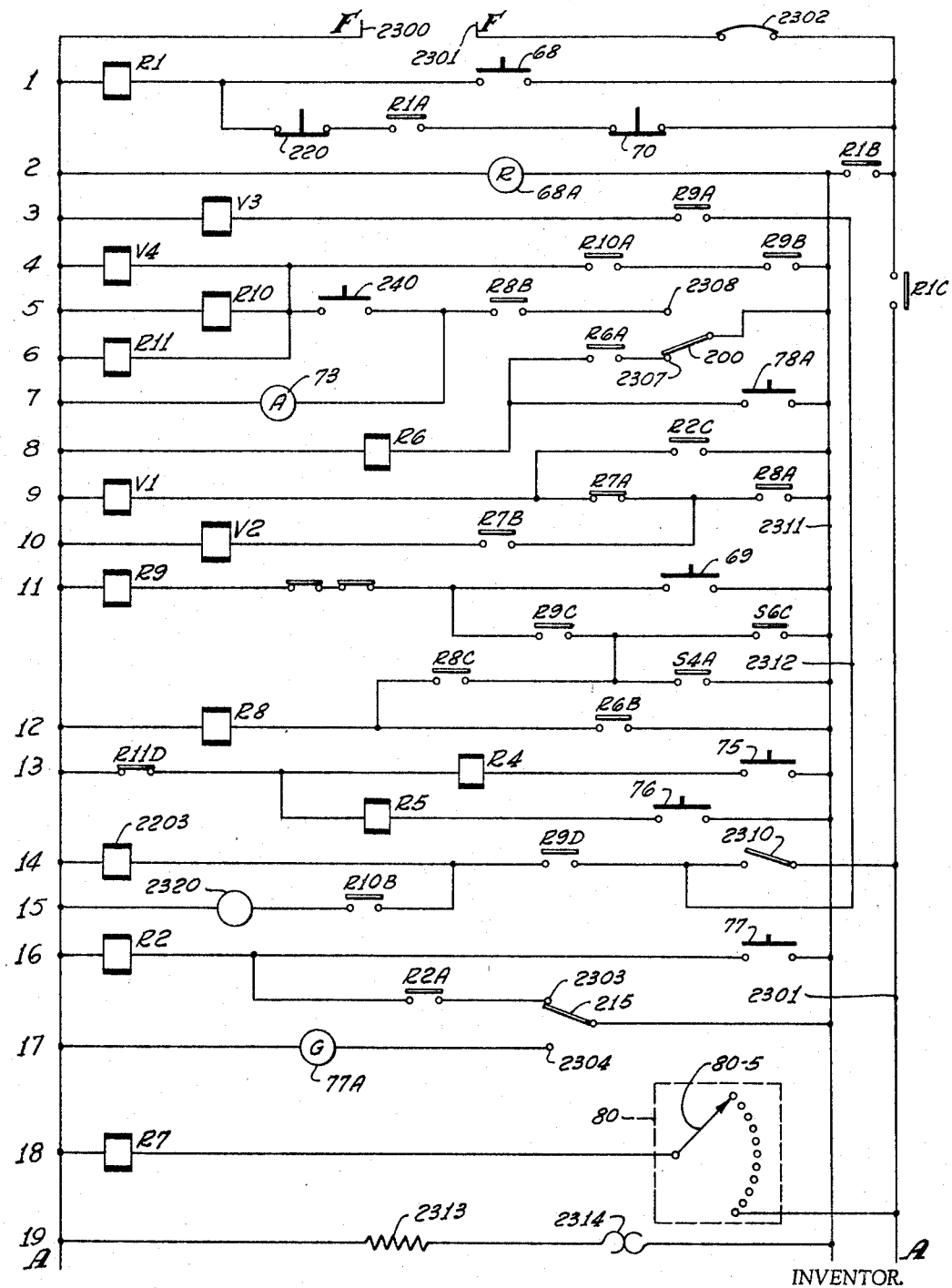

Referring to FIGS. 22 through 27, they illustrate the schematic diagrams of the programmer. All of the above figures represent one single schematic diagram with the figures serially connected to each other in the following manner: In FIG. 22 conductors FF are connected to conductors FF in FIG. 23; conductors AA in FIG. 23 are connected to conductors AA in FIG. 24; conductors BB in FIG. 25 are connected to conductors BB in FIG. 24; conductors CC in FIG. 24 are connected to conductors CC in FIG. 26; conductors CC at the bottom of FIG. 24 are connected to conductors CC in FIG. 27; and, finally, conductors DD at the bottom of FIG. 26 are connected to conductors DD at the top of FIG. 27. The relative positions of these figures with respect to each other is also illustrated in FIG. 21.

Proceeding with the description of the above figures, three conductors 2200 represent the three-phase power supply, which is used for energizing the entire programmer, including the azimuth motor 31, which is a split phase induction motor connected to the three-phase source 2200 through a two-pole circuit breaker 2201 and contacts R3A and R3B of an azimuth relay R3. A magnetic starter 2203 supplies power to a three-phase induction motor 2204, which is used for operating the extruder. Suitable conventional protection is included in the circuit of the extruder motor. One of the phases impresses alternating current through a transformer 2205 on the alternation current busses 2300 and 2301 which supply power for the operation of the entire programmer. A suitable circuit breaker 2302, FIG. 23, is connected in series with buss 2301.

Before proceeding with the description of the connections and some of the functions of the circuits, it should be stated here that the entire schematic diagram will be described following the "logic" of the circuits. Stated differently, the circuits and connections will be described as closely as possible following the sequential operation and functional cycle of the programmer. The connections illustrated in the schematic diagrams do not follow, in all instances, this "logical" order and, therefore, it will be necessary to digress from the sequential physical appearance of the elements in the schematic diagram and, instead, as stated above, follow the "logic" of the programmer.

Referring to FIG. 23, and following the above "logical sequence," relay R1 is connected across busses 2300 and 2301 through a push button 68, which is the push button located on panel 54 and marked "Power On." This is a manually operated push button which energizes the programmer and relay R1. Relay R1, when energized, closes three contacts R1A, R1B and R1C. Contact R1A closes the holding circuit through the emergency stop push botton 220, which is also shown in FIG. 1 directly above hopper 26. It is the push button which is used for de-energizing the entire machine, including the extruder, in case of an emergency, such as, for example, when the operator is careless to have his fingers caught in the extruder. The second "Power Off" push button 70 is located on panel 54 and is used for stopping the entire machine in the regular course of events. Upon energization of relay R1, red light 68A is energized, which is a part of the push button 68 and is mounted in the center of this push button. It indicates that the programmer has been energized and that the power is "on."

The next circuit that is placed into operation is the circuit which automatically turns the azimuth column 16 to 0° position, shown in FIGS. 1, 9 and 14. This circuit includes push button 77 (line 16) which is mounted on panel 54 and which is manually operated to energize relay R2, which closes contacts R2B (FIG. 24), R2C (line 9, FIG. 23) and R2A (line 16, FIG. 23). Contacts R2A are in series with the 0° indicating microswitch 215 illustrated in FIG. 7. It is the switch which is mounted at the bottom portion of panel 54 and is used for indicating the 0° position of the azimuth column 16 which is obtained by closing switch 215 with the aid of the radius arm 49. Radius arm 49 is provided for this purpose with a detent 217. When radius arm 49 assumes the 0° position, it transfers its armature 215, shown in FIG. 23 at line 16, from contact 2303 to contact 2304. Relay R2, therefore, becomes de-energized and the green light 77A is energized, which acts as a means for indicating to the operator that the azimuth column 16 has been placed into the 0° azimuth position. This is the position which is used for adjusting the azimuth radius R, illustrated in FIG. 1. The method of obtaining the proper azimuth radius has been described previously.

It may be remembered that when relay R2 became energized, contacts R2B, FIG. 24, and R2C (line 9, FIG. 23) became closed. Contacts R2C are connected in series with the valve operating relay V1, which admits compressed air to actuator 112 shown in FIG. 5. Actuator 112 tightens chain 36 and, therefore, connects pulley 20 to the azimuth motor 31 through chain 36, sprocket wheel 34 and gear box 32. Therefore, because of the above mechanical connection, the azimuth shaft 39 becomes coupled to the azimuth motor 31. The azimuth motor 31 also becomes connected to its source of power because of closing of contacts R2B and energization of relay R3. The azimuth motor 31 will rotate the azimuth shaft 39 and column 16 to their 0° position, whereupon, the azimuth motor will become disconnected from its source of power and the azimuth shaft 39 will be left in the 0° position.

The above cycle operation is obtained as follows. As mentioned previously, upon manually closing push button 77 and immediate energization of relay R2, the holding circuit of relay R2, including contacts R2A and microswitch 215, keeps relay R2 energized, as long as the azimuth column 16 is in any other position than the 0° position. Because of the closing of contact R2B, relay R3 becomes energized, which connects contacts R3A and R3B to the three-phase source 2200, with the result that the azimuth motor 31 becomes energized and remains energized, as long as contacts R2B remain closed. Contacts R2B remain closed until the azimuth column reaches the 0° position, whereupon microswitch 215 transfers its contacts from contact 2303 to contact 2304, lighting green light 77A and de-energizing relay R2 and all of its contacts, including contact R2B, which stops the azimuth motor. Temporary energization of relay R2 also closes contacts R2C, which, as mentioned previously, energizes the solenoid valve V1 of the air cylinder 212, tightening chain 36. Therefore, the azimuth motor 31 is coupled to pulley 20 and remains coupled to pulley 20 until relay R2 becomes de-energized. The net result of the above operation is that the azimuth column 16 is placed into the 0° azimuth position.

The next circuit (line 13) includes safety contacts R11D of relay R11, relays R4 and R5 and winding radius push button switches 75 and 76, which are the switches used for operating the azimuth radius motor 143 either in one direction or the other so as to either increase or decrease the azimuth radius. The circuit of the azimuth radius motor is illustrated at the top of FIG. 25 at 143. The field winding 2500 of the motor is connected across busses 2501 and 2502 all the time through a circuit breaker 2503. The armature 2506 of this motor is normally shunted by a resistor and the normally closed contacts R4A, R4B, R5A and R5B. Such shunting of the armature prevents motor 143 from coasting after it becomes disconnected from busses 2501—2501. Contacts R5C and R5D, R4C and R4D are normally open.

When relay R4 is operated, contacts R4A and R4B open and contacts R4C and R4D close. With these connections, the flow of current from the positive buss 2501 to the negative buss 2502 is from right to left in the armature 2506 of the motor, as viewed in FIG. 25, the circuit being as follows: Buss 2501, circuit breaker 2503, contacts R4C, armature 2506, contacts R4D and buss 2502. When relay R4 is de-energized and relay R5 is energized, the direction of rotation of the azimuth motor 143 is reversed and the flow of current is from left to right, as viewed in FIG. 25, the circuit being as follows: Buss 2501, circuit breaker 2503, contacts R5C, contacts R4A, armature 2506, contacts R4B, R5D and buss 2502. In this manner by closing either push button 75 or 76, the magnitude of the azimuth radius can be readily adjusted by operating the direct current motor 143 either in one or the other direcion.

It should be noted here that the circuit of the push buttons 75 and 76 and of relays R4 and R5 also includes the safety contacts R11D. These contacts are normally closed, but they become open and remain open when the programmer becomes energized upon energization of relays R10 and R11 (lines 4 and 5) and begins its operation. From then on, contacts R11D remain open until the programmer cycle has been completed. In this manner, accidental operation of the push buttons 75 or 76 will have no effect on the azimuth radius and motor 143 from the moment the programmer has been put into operation.

From the description given thus far, it follows that the casing has been placed into the position so that it has a proper azimuth radius and an appropriate card has been placed onto the programmer panel 54 and the dials 80 through 85 are then placed into their proper angular positions from the information given on the face of the card. The next step is to place the casing and the azimuth column into proper "Spin and Azimuth Starting Positions," i.e., that angular position of casing 106 on the spin axis which arbitrarily is chosen to be the starting position. This Starting Spin Position is necessary because the operation of the programmer depends on the revolution of the casing around the spin axis and, therefore, the program cycle should always start when casing 106 is placed to a known angular position, which is called here the starting spin position. The same is also true of the Starting Azimuth Position which determines the total width of the variable thickness layer that will be applied to the casing: Either a narrow ("recapping") or a wide ("retreading") layer will be deposited on the casing depending on the starting azimuth position. In order to achieve this, the azimuth column is rotated beyond the point of the expected azimuth starting position. This azimuth starting position is indicated on card 60, which has been placed on panel 54, as indicated in FIG. 12. This azimuth position, in the illustrated example, begins at 45°, which is the position of the first indentation on card 60. The azimuth column then is turned until the card scanning switches are beyond the 45° position, which is indicated on the protractor 225 at the base of the azimuth column by a protractor pointer 226. Once the azimuth column has been placed into this angular position, say 65°, push button 78 on the panel 54 is operated and, therefore, two sets of contacts of this push button 78A (line 8, FIG. 23), and 78B (FIG. 24) become closed. Closing of contacts 78A energizes relay R6, and relay R6 remains energized with the aid of its holding circuit, which includes contacts R6A, spin switch 200, which is now on contact 2307 which connects relay R6 across busses 2300 and 2301. Energization of relay R6 opens (see FIG. 25) contacts R6C, R6E, and closes contacts R6D, all of these contacts being shown in FIG. 25. They are used for starting and stopping the rotation of the spin motor 154, which is also shown in FIG. 25 with its field winding 2507 and its armature 2508. The field winding of the spin motor 154 is normally connected across direct current busses 2501 and 2502 through a circuit breaker 2509, but the armature 2508 is either shorted by a resistor 2510 and contacts R11A and R6E, such shorting of armature 2508 preventing the rotation or coasting of the spin motor once its armature has become disconnected from the source of direct current by a silicon controlled rectifier 2511, which is in series with the armature.

It may be helpful here to digress from the description of FIG. 23 and describe the functioning of the circuit controlling the current flowing through armature 2508 of the spin motor shown in FIG. 25. It has been stated previously that the speed of the spin motor must be controlled continuously so as constantly to make it correspond to the rate of extrusion of ribbon 110 by the extruder and, in this manner, prevent either stretching of the ribbon or piling up excessive amounts of ribbon in loop 111 that is always present between the extruder and the stitcher. Control of the speed of azimuth motor 154 is obtained by varying the amount of current flowing through armature 2508. The wave form of the voltage applied across armature 2508 is illustrated at 2525. This is obtained by controlling the conductivity of the silicon controlled rectifier 2511 by impressing a suitable potential on its control electrode 2526. The voltage wave form appearing across direct current busses 2501 and 2502 is illustrated at 2527 and it is the silicon controlled rectifier 2511 which transforms it into the wave form 2525 appearing across armature 2508. The period $t_1$ of the individual pulses of the wave form 2525 is made either shorter or longer and in this manner, either larger or smaller current flows through armature 2508 and, in this manner, rectifier 2511 controls the speed of motor 154. Such control is obtained by means of a circuit which includes transistors 2512 and 2514, zener diodes 2517 and 2518, unijunction transistor 2528, transformer 2519 and silicon controlled rectifier 2511. Transistor amplifiers 2512 and 2514 are not used for controlling the speed of the spin motor 154: rather, they are used to change the setting of the idler roller 226, FIG. 1, which is supported by ribbon 110 and loop 111. Different stocks may require different sizes of loop 111, which means that roller 226, FIG. 1, may occupy a different angular position. Since the level arm 227 of roller 226 is connected to a potentiometer which is used for controlling the speed of the spin motor 154, it becomes necessary to provide a counterbalancing potentiometer in the speed control circuit so as to change the setting of the second potentiometer in proportion to the change obtained in the potentiometer by the level arm 227. The level arm 227 is illustrated in FIG. 25 as potentiometer 2516. The second potentiometer which is used for counteracting the effect produced by the change in the setting of potentiometer 2516 is the potentiometer 2515. Once these two potentiometers have been set to produce the desired spin speed at the desired size of loop 111, from then on any change produced in the setting of potentiometer 2516 due to the change in the magnitude of loop 111 will produce a corresponding change of the potential at point 2530 in the circuit of the amplifiers 2512 and 2514 and this potential is then impressed on the emitter 2531 and the capacitor 2532 connected across the emitter 2531 and base 1 electrode 2533 of the unijunction transistor 2528. Transistors 2512 and 2514, therefore, act as a differential amplifier controlling the potential of point 2530, which, in turn, controls the charging voltage impressed on capacitor 2532 and, in this manner, controls the interval of time, $t$, shown in the wave form 2533, which is required to charge this capacitor to that voltage which produces the firing of the unijunction transistor 2528. After this maximum voltage is reached, transistor 2528 becomes conductive and delivers a pulse to the control electrode 2526 of the silicon controlled rectifier 2511 through a transformer 2519. The rectifier then becomes conductive, thus delivering a pulse 2525 to the armature 2508 of the spin motor. The shorter the period $t$ of the wave form 2533, the longer is the duration $t_1$ of the wave form 2525. In this manner, the current delivered to armature 2508 can be made either larger or smaller. The sum of $t$ and $t_1$ is equal to the half a period $T$ of the basic sinusoidal wave impressed on a rectifier 2400, FIG. 24, through conductors 2401 and 2402. Rectifier 2400 furnishes the voltage wave form 2527 across conductors 2501 and 2502. The additional elements which are also present in the speed control circuit are zener diodes 2517 and 2518, connected across busses 2535 and 2502, which divide the potential drop in proportion to the rated voltages of these two diodes. The potential drop across diode 2517, in one specific case, is in the order of 25 volts and the potential drop across diode 2518 is in the order of 10 volts. These two zener diodes 2517 and 2518 "clip" the rectified wave form 2527 and transform it into a voltage wave 2536 appearing across capacitor 2532. It is this voltage wave 2536 that is used for controlling the operation of the transistors 2512 and 2514 and of the unijunction transistor 2528. Zener diode 2518 also performs an additional function: it properly biases the base electrode of transistor 2512 so that the base electrode has a reverse bias with respect to the emitter to make transistor 2512 non-conductive when potentiometer arm 2537, in effect, becomes connected to conductor 2538 at the end of the potentiometer 2516. In this manner, it becomes possible to obtain the desired full range of speed control for motor 154 with the aid of potentiometer 2516.

Additional elements in the above control circuit comprise a commutating diode 2521 which acts as an armature shunt when the silicon controlled rectifier 2511 is cut off while current still flows through armature 2508. Diode 2521 then provides a low resistance path for the dissipation of the energy still stored in the magnetic circuit of the armature 2508 and also allows for the smooth operation of the spin motor 154. Resistor 2522 is in series with the zener diodes 2517 and 2518 and merely acts as a potential drop device in the zener diode circuit. Resistor 2523 is in series with the unijunction transistor 2528 and also acts as an impedance adjusting device.

Resistors 2524 and 2540 are in series with the charging circuit of capacitor 2532 and in this manner are used to control the rate of charge of capacitor 2532 at the time contacts R6D are closed, which corresponds to that interval of time when the spin motor 154 rotates casing 106 to the starting pin position. The spin rotation of the casing during this initial positioning of the casing into the starting spin position should be done at low spin speed to prevent any over-shooting of the starting spin position. Resistors 2540 and 2524 enable one to obtain this low speed. Resistor 2524 is a potentiometer which can be adjusted to allow for variations in the operational characteristics of the unijunction transistor 2528. Diodes 2520 are connected across rectifier 2511 and short-circuits and transients that may occur during switching or which may occur in the alternating current supply lines 2401 and 2402. These transients may otherwise cause false operation of silicon controlled rectifier 2511.

From the description given thus far, it follows that insofar as contacts R11C and R6D are concerned, they are used when the spin motor 154 positions the casing into the starting spin position, because contacts R11C and contacts R6D connect resistors 2540 and 2524 in series with the charging circuit of capacitor 2532, including conductors 2540, 2541 and zener diode 2518. This circuit also includes normally closed contacts R6C and normally open contacts R11B and R10D of the corresponding relays. Contacts R6C are opened by relay R6 during subsequent operation of this circuit and potentiometer 2524 is used in the circuit of capacitor 2532. In this manner potentiometer 2515 is removed from this circuit, which would otherwise offer a parallel path shunting the capacitor. The remaining contacts R11B, R11C and R10D will be described later in connection with the description of relay R10 and R11 and the functions performed by these two relays. Suffice it to say at this time that the contacts R11C and R10D are used for connecting transistors 2514 and 2512 with appropriate resistors, so that these transistors could control effectively the charging rate of capacitor 2532.

Resuming again the description of the relay circuits of FIG. 23, and more particularly the circuit of relay R7, line 18, it has been previously stated that the programmer is arranged so as to use (see FIG. 12) either the lower scale 127 or the upper scale 126 on card 60. Two card reading switches 55 and 56, mounted on their respective arms 48 and 49, are connected to the azimuth motor 31 through a cable drive which was described previously. The cable drive, in turn, has two solenoid operated actuators 113 and 112, and, depending upon the actuation of either actuator 113 or 112, either chain 25 or chain 26 drives pulley 20. All of the above mechanical arrangements are desirable in order to get a higher resolution of the angular movement on the lower scale 127, which is used for truck tires, while scale 126 is used for passenger tires. This selection of either high or low speed azimuth drive is obtained with the aid of a multi-level switch 80 connected in series with relay R7. The multi-level switch 80 has six levels altogether. Only four levels are used in the resistive network 2627 in the timing circuit of the capacitor 2615 in FIG. 26 because sectors A and E use the same resistors in the network but have individual variable resistors 2620 and 2623. The fifth level is used in FIGS. 23 and 24 for selecting the low or high speed azimuth drive and the corresponding card reading switch 56 or 55, FIG. 24, and the sixth level is used in FIG. 24 for including or excluding sectors A and E in the program. In order to make the above selection with the aid of its fifth level and actuation of either one of the two actuators, switch 80 is placed either into one position or the other, the one position being for truck tires and the other position being for passenger tires. If the arm 80–5 or switch 80 is in the position illustrated in FIG. 23, then relay R7 remains de-energized and all of its contacts, which are contacts R7A and R7B in FIG. 23 (lines 9 and 10) on contacts R7C and R7D in the lower right corner of FIG. 24, are in the positions illustrated in FIGS. 23 and 24. Contacts R7A are normally closed and are in series with contacts R8A. Therefore, at this time solenoid operated valve V1 (line 9) becomes energized, which in turn energizes actuator 112, which pushes its push rod 114 and sprocket wheel 117 against chain 36, with the result that chain 36 and sprocket wheel 34 become connected in the driving manner to pulley 20. Accordingly, pulley 20 is now turned at an appropriate angular velocity determined by the azimuth velocity of sprocket 34, and this rotation of pulley 20 is finally transmitted to the scanning switches 55 and 56. As stated previously, only switch 56 is actually instrumental in controlling the programmer at this time because only scale 126 has indentations along its scale. Therefore, switch 80, its arm 80–5 and relay R7 are used to select one of the two possible azimuth drives.

As mentioned previously, in order to start the operation of the machine and of the programmer, it is necessary to position the casing into two proper starting positions, the starting azimuth and spin positions. The method of positioning the wheel into the starting spin position has been described previously and what appears below will describe the positioning of the azimuth column into the desired starting azimuth position.

In order to position the azimuth column into the proper azmuth starting position, it is necessary to connect an azimuth motor for the rotation of the azimuth column 16 from that angular position which was obtained when the operator manually turned the azimuth column 16, which is now unlocked and free to turn, beyond the angle indicated on scale 126. The azimuth motor is controlled by the azimuth relay R3. The circuit of this relay is shown in FIG. 24, and therefore, before proceeding with the description of the functional cycle of this relay, it will be necessary to describe the connections illustrated in FIG. 24. Alternating current is supplied to the circuits of FIG. 24 through conductors 2300 and 2301. In order to obtain a more positive operation of the stepping switch, relay R12 and of the azimuth motor relay R3, the alternating current is converted into direct current by rectifier 2400 which then impresses direct current on two direct current busses 2401 and 2402.

The only relays in FIG. 24 are the azimuth motor relay R3 and the stepping switch relay R12.

Relay R3 connects and disconnects power from the azimuth motor 31, FIGS. 1, 10 and 22 by closing and opening contacts R3A, FIG. 22, during each spin revolution for a variable and controllable interval of time. This interval of time is controlled by the timing circuit shown in FIG. 26 which will be described later.

Relay 12 operates the stepping switch which in turn controls the sequence of operation of the programmer after the programmer has been put into operation. The operation of the stepping switch also controls the operation of relay R3.

Before proceeding with the description of the circuits of the two relays R3 and R12 shown in FIG. 24, it will be necessary to digress once more and describe a stepping switch used in the programmer because the twenty-four contacts of this switch are used in many parts of the programmer and FIGS. 24, 25 and 26. The description of their mode of operation is essential for understanding the connections and the operation of the programmer. This switch is not illustrated as a unit, in an assembled form in the drawings, because such switches are known to the art, but its essential parts, such as the eight cams and the cam-actuated contacts, are illustrated in FIGS. 29–33 and its stepping relay R12 is shown in FIG. 24. The armature of relay R12 is connected to a ratchet wheel and turns the cams, "or the barrel" of the switch in 10° steps every time relay R12 is energized and then de-energized.

The rotary stepping switch is of the type described and fully illustrated on pages 36–41 of Technical Bulletin 473 of the Automatic Electric Company of Chicago, entitled "Rotary Stepping Switches," and designed by Automatic Electric as the "OCS Relay." It is a unidirectional rotary stepping switch operated by a single relay, which is relay R12 in FIG. 24. The switch, as manufactured by Automatic Electric, may have any number of cams up to eight cams. The cams comprise eight discs, such as disc 3100 in FIG. 13, bolted together through two bolt holes 3110 and 3111 to make up a single cylindrical barrel which is rotated through a 10° step for each energization and de-energization of relay R12. A central hole 3112 is used for mounting all cams on a common axis.

The cam illustrated in FIG. 31 is cam #6 and the side view of the notched portions of all eight cams is also illustrated in FIG. 29, where they are unfolded, or developed, along straight lines. All cams in the stepping switch are circular cams of the type illustrated in FIG. 31 and each cam has its own notches spanning different degrees at the desired angular positions along the periphery of the cam. Cam #6 has two long notches 2906 and 2907 and the high portions 3101 and 3102. The cam can be divided into two identical halves along line 3124 bisecting the cam. This is due to the fact that the operation of the machine and programmer is completed during 180° rotation of the cams, and, therefore, the succeeding 180° constitute merely a repetition of the same preceding cycle that has been obtained during the first 180°. The eight cams #1 through #8 are developed along their individual straight lines in FIG. 29 and under each other in proper phase relationship. Since the first 180° of each cam are identical to the succeeding 180° (i.e., from 180° to 360°), only the first 180° of the cams are illustrated in full in FIG. 29, and the remaining 180° are omitted except for the 190° and the 360° portions (0° and 360° are superimposed). Accordingly, in giving the description of the programmer and of the stepping switch, it will be necessary to describe only the first 180°. FIG. 29 indicates that the notches in one cam differ in shape and their angular position on the cam when compared with the remaining cams so that there are no identical cams among the eight cams. Cam #1 in FIG. 29 has notch 2900 which is located at 30° of the cam in accordance with the designation of the degrees appearing in FIG. 30. This table of degrees is in proper alignment with the cams of FIG. 29. Directly below the degrees column there is a table which gives the same information that is given in FIG. 29 but in a tabular form, with the location of the notches being designated by the crosses in the table. Cam #2 has a notch 2901 at 40°; cam #3 has notch 2903 at 50°; cam #4 has a notch extending from 10° up to and including 170°; cam #5 has a notch 2905 at 70°; cam #6, which corresponds to cam 3100 illustrated in FIG. 31, has a first notch at 0° and a second notch extending from 90° through 180°; cam #7 has a notch 2908 at 60° and cam #8 has a notch 2909 at 10°.

In order to explain the operation of the programmer and of the stepping switch, which is an integral part of the programmer, it becomes necessary at this time to explain the nomenclature that will be used in connection with the stepping switch and the programmer. Each cam operates three contacts in the manner illustrated in FIGS. 29, 32 and 33. As illustrated in these figures, when a metallic cam follower element 2915 is on the high portion of cam 2901, or cam #1, in FIG. 29 of cam follower 3202 on the high portion 3201 in FIG. 32, contacts C are closed and contacts A and B are open. As illustrated in FIG. 33, when the cam follower 302 is in a notch 3200, then contacts C are open and contacts A and B are closed. The three pairs of contacts A, B and C are electrically independent of each other, and, therefore, each pair is capable of making and breaking their independent circuit.

These contacts will be referred to in the schematic diagram and FIGS. 24, 25 and 26 in the following manner: All contacts will have a letter S in front; then the cam will be referred to in accordance with its numerical order as indicated in FIG. 29 as cams #1, #2, #3, #4, #5, #6, 7# and #8. The letter S (for stepping switch) will be mentioned first, then will follow the letter identifying the contact. Therefore, for example, if one considers cam #1 and contacts A, B and C, the nomenclature of these pairs of contacts will be as follows: S1A, S1B, S1C, numeral 1 referring to "Cam #1" and the letters A, B, and C referring to the respective pairs of the contacts A, B and C illustrated in FIGS. 29, 32 and 33. For cam #2, then, the nomenclature for the switch contacts will be S2A, S2B, S2C, etc.

Referring once more to FIG. 30, the meaning of the crosses appearing in the table of FIG. 30 is as follows: In the first vertical column for 0°, there is one cross which indicates that the cam follower of the cam switch #6 is in the notch 2907, and, therefore, contacts S6C are open and contacts S6A and S6B are closed. The same designations are used throughout all of the 360° of the seven cams. The crosses, therefore, indicate when the cam followers, such as 2915, are in their respective notches. The absence of the crosses indicates that the cam followers are on the high portions of their respective cams, such as 2901 on cam #1. Since the cams and their notches and the high portions are properly aligned with the table (so-phased), all one has to do is to follow the vertical center lines from the cams into the table and thus obtain the state of the respective switches, i.e., whether they are in a closed or open position at any given 10° step.

Referring now again to FIG. 24 and the circuits for the azimuth motor relay R3, there are seven parallel circuits which control the operation of relay R3. They are as follows:

The first circuit for operating relay R3 in FIG. 24 includes only contacts R2B. Contacts R2B are normally open and are closed when relay R2 is energized after push button 77 is closed for energizing relay R2 which in turn, energizes relay R3 through the now closed contacts R2B. As described previously, this circuit is used to rotate the azimuth column into the 0° azimuth position for subsequently adjusting the azimuth radius to that value which is given on card 60. Once the azimuth column has been rotated by the azimuth motor 31 into 0° position, the azimuth switch 215 opens the circuit of relay R2, contacts R2B open, relay R3 is de-energized and the azimuth motor 31 becomes disconnected from its A.C. source. To accomplish this, the 0° azimuth switch 215 must be carefully aligned on the frame of the machine so as to be exactly in line with the 0° reading on card 60 and at the same time the azimuth column 16 and the two azimuth drives, including chains 35 and 36 and cables 46 and 47, are all also adjusted to place column 16, protractor 225 and protractor pointer 226 into the true 0° azimuth positions with the casing being aligned with the longitudinal axis 900 passing through the center of stitcher azimuth arm 86. From then on, this first circuit, including contacts R2B, having performed its function by rotating the azimuth column 16 into 0° azimuth position, remains inoperative to the very end of the entire operating cycle.

The second circuit for operating relay R3 in FIG. 24 is the one including contacts S4B and S8B of the stepping switch. Contacts S4B and S8B, according to FIGS. 29 and 30, are normally open when the stepping switch is in its "home" or 0° position and become closed when the stepping switch is in its 10° position, thus connecting the azimuth motor 31 to its A.C. source. At this stage, motor 31 is operated to rotate the azimuth column 16 into its starting azimuth position, at which winding of ribbon 110 should start. This position is determined by the location of the first indentation 131 or 120 on card 60, depending upon the scale used on the card. As mentioned before, selection of the scale is done manually by the operator by turning switch 80, FIG. 23 (line 18) to the desired position.

The azimuth motor 31, as stated above, becomes connected to power when the stepping switch steps to 10° position and contacts S4B and S8B become closed. It now is only necessary to open either contacts S4B or S8B, when the azimuth motor 31 turns column 16 to the desired azimuth starting position. Since motor 31 also now rotates the card reading switches 56 and 55, either one or the other of these switches will finally encounter the first indentation on its scale. Normally, when there are no indentations on card 60, these two switches have their armatures 56A and 55A, FIG. 24, on the lower contacts 2430 and 2431. In this position, the card reading switches 56 and 55 are connected in series with the light 72, the secondary of a step-down transformer 2406 and contacts R7C and R7D of relay R7. Contacts R7C are normally closed and contacts R7D are normally open and, therefore, light 72 is energized as long as the switches 55 and 56 and their armatures 55A and 56A are on the smooth portion of card 60. When indentation 120 or 131 is encountered, either armature 55A is transferred to contact 2417 or armature 56A to contact 2411. The circuit then is completed for energizing relay R12 over conductors 2410, 2414, 2415, switch 71 and closed contacts S4B. The stepping relay R12 thus becomes energized and steps the switch to the 20° position, at which time contacts S8A open and the azimuth motor relay R3 becomes de-energized. In this manner the casing is placed into the start azimuth position. It is to be noted that at the time the casing is placed into the starting azimuth position, the azimuth column remains locked in this angular position, since either V1 or V2 solenoid remain energized, and therefore, either chain 35 or 36 holds the azimuth column 16 in its locked angular position. The only way that the azimuth column can be moved thereafter is by energizing the azimuth motor 31.

From the examination of FIGS. 29 and 30, it follows that contacts S4B remain closed between 10° and 170° positions of the switch, and therefore, the third circuit for operating relay R3 is the one through relay S4B, conductor 2410, contacts R10C of relay R10, spin switch 201A, contacts S1B, switch 80A, conductor 2416 and contacts R13A. Contacts R13A are the contacts of the timer relay in the timing circuit, FIG. 26, and therefore, the duration of the time period during which this circuit is energized is determined by the timing circuit. The circuit through contacts S1B is the circuit for winding sector A and the circuit through contacts S5B is for winding sector E. These are the two sidewall sectors shown in FIGS. 1, 2 and 3. Therefore, the circuit through contacts S1B, which is designed as the "3rd" circuit for energizing relay R3 is the circuit which begins the azimuth movement and the circuit through contacts S5B, which is also designated as the "7th" circuit for operating relay R3, terminates the azimuth movement when contacts S5B open. The manually operated switch 80 is included in these two sidewall circuits so as to enable the operator either to include or exclude sectors A and E. Sectors A and E are included when it is desirable to wind, or deposit, some elastomeric material on the sidewalls. Sectors A and E are excluded when it is not necessary to deposit any elastomer on the sidewalls, but the winding is restricted only to sectors B, C and D, which are the two shoulder sectors and the crown sector. Such type of deposit is equivalent to the so-called "top cap" as differentiated from "full cap." When switch 80 is on contact 2425 or any other contact connected to conductor 2416, then the sectors A and E are included in the programmer cycle because contacts S1B and S5B and switch 80A are then connected in series with relay R3. When, on the other hand, switch 80 is on contact 2424 or any other contact connected to conductor 2416, then contacts S1B and S5B and switch 80 are in series with relay R12 over conductor 2420, self-interrupting contacts 2404, conductor 2421 and relay 12, this circuit also including fuse 2404, now closed contacts S4B, conductor 2410, contacts R10C and spin switch 201A. This circuit for relay R12, because of the presence of the self-interrupting contacts 2404, steps the stepping switch automatically to that angular position of the switch which opens contacts S1B and S5B, which are the 40° position (see FIGS. 29 and 30) for S1B and the 70° position for S5B. In this manner, the sidewall sectors A and E can be included or excluded by the operator by manually setting switch 80 prior to the operation of the machine.

The fourth circuit for operating the azimuth motor relay R3 in FIG. 24 is again through conductor 2410, contacts R10C, spin switch 201A, contacts S2B, conductor 2416 and contacts R13A. This circuit is for winding sector B. It is to be noted here that all of the sector winding circuits for relay R3 include the spin switch 201A and contacts R13A of the timing relay R13 illustrated in FIG. 26, which is the only relay in FIG. 26. As will be described more in detail later in connection with the description of FIG. 26, relay R13 is operated by the timing circuit during each spin revolution for different intervals of time, or duration, in different sectors A through E and, in this manner, a variable thickness layer is deposited on the outer surface of the casing. Since counting spin revolutions is essential for proper operation of all sector circuits A through E, the spin switch 201A is also included in series with all of these sector circuits.

The fifth and sixth circuits for relay R3 are identical to the fourth, except that the fifth circuit is through contacts S3B and the sixth circuit is through contacts S7B. The fifh circuit is for winding the crown sector C and the sixth circuit is for winding the second shoulder sector, or sector D.

The seventh circuit is through contacts S5B for winding the ribbon on sector E. This circuit was described earlier.

In the light of the above description of the seven parallel circuits for operating the azimuth relay R3, it may be summarized by stating that the relay R3 has five "sector" circuits, A through E, which are also designated as such in FIG. 24, one circuit through contacts R2B for rotating the azimuth column to 0° azimuth position, and one additional circuit through contacts S4B and S8B which is used for rotating the azimuth column 16 to its proper azimuth starting position corresponding to the first indentation on one of the scales appearing on card 60.

It should be noted here also, in the light of the prior discussion, that the protractor pointer and the azimuth column 16 are always in strict "phase relationship" with the position of the card reading switch 56 and its roller 128 on the upper scale 126. The same is also true of the second card reading switch 55 and its roller 129, which contacts 0° point or card 60 when column 16 is in 0° azimuth position, etc.

Proceeding now with the description of the circuits for the stepping switch relay R12, relay R12 also has seven parallel circuits for its operation. The first circuit is over conductor 2418, push button switch 78B, contacts S4C and S6B, conductors 2419, 2420, self-interrupting contacts 2404, conductor 2421 and relay R12. This circuit has been described already earlier. It is used for stepping the stepping switch from its 0° position to a 10° position upon the operation of the push button 78B by the operator. It may be recalled that this is the push button which is operated for placing the casing into its proper starting azimtuh position.

The second circuit for relay R12 in FIG. 24 is the circuit through contacts S4B, conductor 2410, contacts S8A, either of the two card reading switches 55 or 56 when they are on contacts 2411 and 2412, conductors 2414 and 2415, and push button switch 71. The second circuit is used for stopping the azimuth rotation after the starting azimuth position has been reached by column 16. This circuit also has been described previously. The azimuth rotation is stopped by stepping the stepping switch from 10° to 20° position after switch 55 or 56 reaches the first indentation on card 60, whereupon contacts S8B open and stop the azimuth motor because of de-energization of relay R3. Thereafter, contacts S8B remain open for the rest of the operating cycle and control of relay R3 is transferred to the five circuits designated as sector A through sector E circuits.

The third circuit for relay R12 is through contacts S4B, conductor 2410, contacts R10C, the spin switch 201A, when it is on contacts 2423, contacts S1C, S2C, S3C, S5C, S7C, conductors 2414 and 2415 and switch 71. This is the circuit which counts the first turn (this turn is less than 360°; it is in the order of 300° to 320°) of the casing around the spin axis which takes place without any azimuth movement, i.e., with the azimuth motor disconnected because at this time contacts S8B, S7B, S3B, S5B and S1B are all open.

The fourth circuit for relay R12 is through contacts S4B, conductor 2410, contacts R10C, spin switch 201A, either contacts S1B or S5B, the program switch 80 when its arm 2442 is on contact 2424, conductor 2420, self-interrupting switch 2404 and relay R12. This circuit is used for either including or eliminating sidewall sectors A and E. When arm 2442 is on contact 2425 or any other contact or contacts of switch 80 which is or are connected to contact 2425, then the sidewalls are included. When arm 2442 is on contact 2424, or any other contact or contacts which is or are connected to contact 2424, then the sidewalls are not included in the operating cycle of the programmer. These circuits were described before in connection with the description of the seven circuits for relay R3. It is to be noted that each level of the seven levels of switch 80 includes eleven contacts.

The fifth circuit for relay R12 is the circuit which includes contacts S4B, conductor 2410, contacts R10C, S8C, conductor 2426, either card reading switch 56 or 55, conductors 2414 and 2415, push button switch 71 and the stepping relay R12. This is the circuit which may be referred to as a card reading circuit, since it determines the termination of one sector and beginning of the next sector, and card 60 is directly included in this circuit because the card reading switches 55 and 56 are connected in series with this relay circuit. When the card reading switches 55 or 56 encounter indentations on the card scales 126 or 127, the switches break contacts 2430 and 2431 and open the circuit of light 72 and momentarily close and then open the circuit of relay R12. Relay R12 steps the stepping switch to the next angular position of 30°, which corresponds to sector A. This fifth circuit then steps the stepping switch relay R12 through all the sectors A through E in the same manner as from 20° to 30° every time the card reading switches encounter an indentation on card 60 until the last indentation has been reached and scanned by the card reading switches. Stepping of the stepping switch also sequentially opens and closes contacts S1B, S2B, S3B, S7B and S5B in the five sectors A through E circuits of relay R3 and thus completes the winding of the ribbon along these sectors.

The sixth circuit for relay R12 includes contacts S4B, conductor 2410, conductor 2427, push button switch or reset switch 71, if it is manually closed, self-interrupting contacts 2404 and relay R12. This circuit is used for manually resetting, by operating the push button 71, the stepping switch to its home position in case of some malfunctioning of the machine in the course of its normal operating cycle, and it then becomes desirable to return the stepping switch at once to its home position and, at the same time, stop the entire machine. Such resetting is accomplished by manually pushing push button 71, which closes the two contacts 2450 and 2451 and opens contacts 2452 and 2453. Relay R12, therefore, becomes connected to busses 2401 and 2402 through contacts S4B, self-interrupting contacts 2421 and push button switch 71 and relay R12, with the aid of contacts 2421, steps the stepping switch until 0° or 180° is reached, at which time contacts S4B become open, de-energizing this circuit. Simultaneously with the opening of contacts S4B, contacts S4A become open, with the result that the holding circuits of the relays R8 and R9 become open, de-energizing relays R8 and R9 and their associated contacts, which results in the programmer becoming de-energized.

The seventh circuit for relay R12 includes contacts S4B, conductor 2410, contacts S6A, conductors 2428, 2419 and 2420, self-interrupting contacts 2404, conductor 2421 and relay R12. This is the circuit which is called the automatic homing circuit because it automatically returns the stepping switch to its home position upon closing of contacts S6A. This is accomplished because of the continuous interruption of the circuit by the self-interrupting contacts 2404 which, in this manner, very quickly return the stepping switch to its home position. This circuit is placed into operation at the end of the entire winding cycle, including the last spin turn and the last turn of ribbon 110, at which time the stepping switch is momentarily placed into the 90° position, whereupon it is advanced at once to the 180° position or 0°, both of the above positions, 0° and 180°, being the home positions. Cams #4 and #6 both have long notches from 90° to 170° and, therefore, contacts S4B and S6A remain closed until the stepping switch reaches 180° or 0°, at which time contacts S4B become open and stop the stepping switch and the entire machine.

The only remaining circuits in FIG. 24 are transformer 2406 and light 72, which is energized by transformer 2406 when card reading switches 56 and 55 are in the position illustrated in FIG. 24 and either one of the contacts R7C or R7D are closed. Light 72 thus indicates the position of the card reading switches for the operator.

A step-down transformer 2407, at the bottom of FIG. 24, is used to supply regulated 6 volt voltage across conductors EE, which are connected to transducer 109 shown in FIGS. 1 and 27. Transducer 109 constantly monitors the thickness of the ribbon. The schematic diagram of transducer 109 is illustrated in FIG. 27.

Referring now to FIG. 27, the output of transducer 109 is impressed across a potentiometer 2700 and resistors 2710 and 2711. The signal then is impressed on two transducer voltage amplifiers 2701 and 2702 and a step-up transformer 2703. The secondary of transformer 2703 is connected to a rectifier 2704 which impresses the rectified signal across a resistor 2708 and a filtering capacitor 2709. The voltage appearing across resistor 2708 is then used for indicating the thickness of the ribbon with the aid of a D.C. voltmeter 74, and also for impressing this direct current signal, whose magnitude corresponds to the thickness of the ribbon, on an outgoing conductor 2614. Conductor 2614 is also illustrated at the bottom of FIG. 26, where it is connected to an emitter follower 2613 for combining the direct current signal whose amplitude is proportional to the thickness of the ribbon with the voltage used for operating the timing circuit, including capacitor 2609 and timing circuit of FIG. 26. Diode 2706 is connected across resistor 2708 and is used for limiting the maximum voltage that may be impressed on meter 74. Diode 2705 is used to bias conductor 2715 so that meter 74 would read 0 when conductor 2715 is 10 volts above conductor 2716. This is accomplished by connecting diode 2705 in series with resistor 2707 across busses 2716 and 2717, which correspond to the similarly numbered busses 2716 and 2717 in FIG. 26. These busses are supplied with direct current by the circuit shown in FIG. 26, which includes transformer 2600, rectifier 2601, filtering circuit 2602 and a voltage limiting diode 2603.

FIG. 26 illustrates the schematic diagram of the timing circuit used for timing the duration of that interval of time when relay R3 and the azimuth motor 31 are energized and, therefore, there is an azimuth rotation. The azimuth rotation being started at the moment when the casing is in the "starting spin position" and then continues for a fraction of a revolution, which may be from 10°–60° minimum and from 60°–160° maximum. During the remaining 350°–300° maximum and 300°–200° minimum there is no azimuth rotation but the spin rotation continues uninterrupted, with the result that a continuous composite variable pitch spiral of the type illustrated in FIG. 3 is wound on the casing. It is preferable to have the minimum duration azimuth rotation over a longer period of time than the 10° sector. It is preferable to continue the azimuth rotation until ribbon 110 spans a minimum sector in the order of, say, 60°, rather than 10°, so that there is no sudden lateral shift of the ribbon, but such shift is distributed over a longer sector, such as 60°, with gradual lateral shift of the ribbon. The maximum sector, then is in the order of 120°, as mentioned previously in connection with the description of FIG. 3.

Whatever the length of these sectors, or the duration of the azimuth rotation, such start-stop azimuth rotations during each spin revolution must be very carefully timed, since it is this timing of the azimuth rotation that determines the thickness of the deposited elastomeric layer. Also, the durations, or the lengths, of these time intervals remains substantially constant as long as the thickness of the ribbon remains constant and these time intervals change from sector-to-sector, since the thickness of the elastomeric layer changes from sector-to-sector, although it remains constant within each sector. Such timing of the periods of the azimuth rotation is accomplished with the aid of a charging circuit, including a capacitor and a resistor in series with a capacitor, a source of direct current and a unijunction transistor for discharging the capacitor after the potential across the capacitor has reached that level which makes the unijunction transistor conductive. The timing circuit, therefore, is analogous to a typical relaxation oscillator circuit. Such operation of the timer is accomplished by sequentially connecting, in series with a capacitor 2615, which is the timing capacitor, different resistances, with the result that the time interval for charging capacitor 2615 to a predetermined voltage is determined by the value of the resistance connected in series with the capacitor. In order to include the ribbon thickness signal in the timing circuit, the ribbon thickness signal appearing on conductor 2614 is first amplified in the emitter follower current amplifiers 2613 and 2612 and 2611, whereupon the signal is impressed on conductor 2616 at point 2617 which is connected in series with resistors 2605, 2607, 2608, diode 2606 and unijunction transistor 2604. Transistor 2604 and resistor 2605 are connected across capacitor 2615 and are used to discharge capacitor 2615 after it has been charged to the potential which makes transistor 2604 conductive. Transistor 2604, resistors 2605, 2607, 2608 and diode 2606 are connected across the charging circuit of the capacitor. The capacitor charging circuit includes buss 2716, spin switch 201B on contact 2631, capacitor 2615, one of the five parallel circuits including contacts S1A, S2A, S3A, S5A, S7A, and resistors 2620–2624, resistive network 2627 and a conductor 2630 connected to buss 2717.

The resistive network 2627 is illustrated only in part in FIG. 28. It includes a plurality of resistors 2800–2807 and five levels of the seven level switch 80, only one level, 80–1, and a part of the second level, 80–2, being illustrated in FIG. 28. The five levels of switch 80 are used to connect any desired resistor in the network 2800–2807 in series with resistors 2620–2624 and, in this manner, enlarge the timing range of the variable resistors 2620–2624 and enable one to obtain finer time adjustments with the variable resistors 2620–2624. Resistors 2620–2624 thus become vernier resistors.

Resistors 2620–2624 are connected in series with their respective stepping switch contacts S1A–S7A, which are sequentially closed by the five stepping switch circuits for sectors A through E, which were described earlier in connection with the description of FIG. 24.

The unijunction transistor 2604 essentially, then, is connected in a typical transistor-resistor relay circuit which becomes conductive after the voltage impressed on the emitter of transistor 2604 by capacitor 2615 reaches a predetermined value. Transistor 2604 thus may be considered also as a saw-tooth oscillator. When unijunction transistor 2604 becomes conductive, it delivers a positive pulse to the gate electrode of the silicon controlled rectifier 2610 and makes this rectifier conductive, which energizes relay R13 and relay R13 in turn opens the circuit of relay R3 by opening contacts R13A, and in this manner stops the azimuth motor 31 and maintains the azimuth motor in de-energized condition until another pulse is delivered to the gate electrode of the silicon controlled rectifier 2610 by transistor 2604. This takes place during the next spin revolution of the casing and after the completion of the next charging cycle of capacitor 2615. Meanwhile, the spin switch 201 completes the revolution because of the continuous spin rotation of the casing around its spin axis, with the result that the spin switch 201B is momentarily transferred from contacts 2631 to contacts 2632, with the result that any residual charge that still may remain on capacitor 2615 becomes completely discharged with the aid of the short-circuiting conductor 2635. The spin switch 201B is then again transferred to contact 2631 and the charging cycle of the capacitor is repeated again. The azimuth motor 31, therefore, is energized from the moment capacitor 2615 begins its charging period after capacitor 2615 has been momentarily shorted by the spin switch 201B. After spin switch 201B leaves contact 2632 and makes contact 2631, the spin motor becomes energized and remains energized until capacitor 2615 discharges through transistor 2604 and rectifier 2610 becomes conductive; relay R13 then becomes energized, thus opening contacts R13A and de-energizing relay R3.

Capacitor 2615 may charge and discharge through transistor 2604 several times during one spin revolution with the circuit acting as relaxation oscillator. This will have no effect on the silicon controlled rectifier, which remains conductive until the spin switch 201B opens its circuit by transferring itself momentarily from contact 2631 to contact 2632 and then back on to contact 2631. The time of travel of the spin switch from contact 2631 to contact 2632 and back to contact 2631 is not included in the interval of time when the azimuth motor is energized because the spin switch 201 has two contacts, 201A, shown in FIG. 24, and 201B, shown in FIG. 26. Both open simultaneously and contacts 201A open the circuit of relay R3 in FIG. 24, thus keeping the azimuth motor 31 de-energized during this period of travel of switch 201.

The circuit for continuously monitoring the thickness of the extruded ribbon 110 begins with transducer 109 in FIG. 27, and terminates at the junction point 2617 and conductor 2616 in FIG. 26. This circuit acts as a means for impressing a control voltage on the B2 electrode of the unijunction transistor 2604 through resistor 2607 and diode 2606. If the ribbon becomes thicker, a larger positive voltage is impressed on the electrode B2. B2 becomes more positive, with the result that it takes a longer period of time to reach that voltage on capacitor 2615 which makes transistor 2604 conductive. The opposite takes place when the ribbon becomes thinner.

The base 2 supply circuit for transistor 2604 includes a resistor 2608, a transistor amplifier 2611 and conductor 2637. Resistor 2607 is included in the circuit of unijunction transistor 2604 so as to make its operation independent of ambient temperature; therefore, resistor 2607 may also be called as a temperature control element. Diode 2606 is included in series with transistor 2604 in order to prevent charging of capacitor 2615 when spin switch 201B is on contact 2632. Such charging otherwise may take place through the unijunction transistor 2604 and transistor amplifier 2611.

The above completes the entire description of all the mechanical and electrical elements of the machine, including its electronic programmer, and it is only necessary now to complete the description of the operating cycle of the machine.

Thus far this cycle has been described to the point when the casing is in the proper azimuth and spin starting positions. Therefore, the machine is ready for winding the ribbon. It may be desirable before starting the actual winding of ribbon 110 on the casing to operate the extruder for a certain period of time to warm up the extruder so as to obtain a smooth, hot and tacky elastomeric ribbon 110, which would be suitable for winding on the casing. In order to start the extruder, two relays are used, which are relays R9 (line 11, FIG. 23) and 2203 (line 14). Relay R9 is the extruder pilot relay and relay 2203 is the extruder power relay. The pilot relay is energized by depressing a push button 69 which energizes relay R9 and closes contacts R9A through R9D. Contacts S6C are now also closed, since the stepping switch is now in the 20° position, at which time the cam follower is on the high portion of cam #6 and, therefore, contacts C are closed and contacts A and B are open. Closing of contacts R9C, therefore, establishes a locking circuit for relay R9 and the extruder pilot relay R9 then remains energized until the completion of the entire operating cycle of the machine, whereupon it is de-energized in a manner which will be described later. Energization of relay R9 also closes contacts R9D and, if the manually operated switch 2310 now is also closed, then the extruder power relay 2203 is also energized, with the result that the extruder motor becomes connected to its source of power in the manner described previously in connection with FIG. 22. Energization of the circuit of the power relay 2203 also closes contacts R9A, solenoid valve V3 becomes energized, connecting cooling water to the barrel and screw of the extruder. After the ribbon is of the desired quality, it is threaded in the manner illustrated in FIG. 1. The program starting switch 240 (line 5, FIG. 23) is then manually closed, whereupon relay R10, R11 and solenoid valve V4 are all energized through switch 240, the now closed contacts R8B and spin switch 200, which is now on contact 2308. Energization of these three relays also closes contact R10A. Contacts R9B are now also closed because of the energization of relay R9, with the result that a holding circuit is established for the relays R10, R11 and V4, and this holding circuit remains closed until the completion of the operating cycle of the machine. Relays R10, R11, therefore, may be called program starting relays. Energization of solenoid V4 opens the compressed air line leading to the stitcher arm actuator 96 which advances the stitcher arm 86 and stitcher 102 until stitcher 102 contacts the casing and begins to stich ribbon 110 to the outer surface 105 of casing 106. In this manner, the winding of the ribbon around the casing is started. It should be noted here that the operator continuously collects the extruded ribbon in his hands prior to the actuation of push button 240 and also keeps it in alignment with the expected location of stitcher 102 and the stitching wheels 104 on the casing. Therefore, when the operator quickly pushes push button 240 and the stitcher strikes the casing, it also strikes the ribbon which is in line with the stitcher and stitches it to the casing which has been previously buffed and coated with rubber cement. The very moment stitcher 102 stitches the ribbon to the casing, the operator tears off the free end of the ribbon, whereupon the machine thereafter completes the entire operating cycle automatically without any assistance from the operator. Upon the completion of the cycle, the machine also stops automatically and de-energizes all circuits.

Energization of relay R10 also closes contacts R10B, which are connected in series with the synchronous clock 2320, which measures the elapsed time from the very beginning to the end of the operating cycle, or, to be more exact, that portion of the cycle during which ribbon 110 is wound around casing 106. This clock is used as a metering device to meter the operation of the machine.

When push button 240 is energized and relay R10 and R11 become energized, the following contacts in FIG. 25 change their position: R11A becomes open, R11B becomes closed, R11C becomes open and R10D becomes closed. Opening of contacts R11A disconnects the shunting circuit, including resistor 2510 across armature 2508 of the spin motor 154, which permits an immediate operation of the spin motor 154. Closing of contact R10D connects the control voltage, appearing at the junction point 2530, on the output side of the differential amplifier 2512–2514, over conductor 2540 to the emitter 2531 of unijunction transistor 2528. The unijunction transistor 2528, which, in combination with the charging capacitor 2532 acts as a saw-tooth oscillator producing a wave form 2533, periodically impresses a pulse on the gate electrode 2526 of the silicon control rectifier 2511, making rectifier 2511 conductive, with the result that current, having a wave form 2525, flows through the armature 2528 of the spin motor 154. Therefore, spin motor 154 is placed into operation and spins casing 106 at a controlled speed corresponding to the rate of extrusion of ribbon 110 from then on to the very end of the cycle, whereupon it becomes automatically disconnected upon the completion of the cycle.

It may be remembered that the control circuit for spin motor 154 is capable of operating it at two different speeds. The first speed is generally a low speed, which is used for rotating casing 106 into its starting spin position. This speed is a low speed so as to prevent overshooting of this spin rotation after the casing 106 has reached its proper starting spin position. The second speed is the speed which is used for winding the ribbon around the casing 106 and this speed, as a rule, is higher than the first speed. It also has been mentioned previously that these two speeds are obtained by either introducing potentiometer 2524 into the motor control circuit or by shunting it with the aid of contacts R11B, which takes place when the programmer starting push button 240 and relay R11 become energized. Contacts R11B then become closed, shunting variable resistor 2524 and the potential which is impressed on the base of transistor 2514 is determined by resistors 2540 and 2515, which are connected in series with each other, this biasing circuit being completed through diode 2518. The dancer roller 226 thereafter controls the position of the potentiometer arm 2537 on the potentiometer 2516 and the potential impressed on the base electrode 2536 of transistor 2512. In this manner, the magnitude of the ribbon loop 111, which, in turn, controls the position of the idler roller 226 and the position of the idler roller arm 227 connected to the potentiometer arm 2537, controls the output of the differential 2512–2514 at point 2530, which, in turn, controls the potential impressed on the control electrode 2531 of the unijunction transistor 2528. In this manner, it also controls the operation of the saw-tooth oscillator, including the unijunction transistor 2533 and capacitor 2532. This, in turn, controls the timing of the pulses impressed on the gate electrode 2536 of the silicon control rectifier 2511. It may be remembered from prior description that this, in turn, determines the duration $t_1$ of the wave form 2525 which, in turn, controls the speed of the spin motor 154 so that it is constantly in proper relationship with the rate of extrusion of ribbon 110.

Thus far, the machine, therefore, has been put into operation so that it winds the ribbon on the casing. From then on, the sequential operational steps of the machine are controlled by that portion of the programmer which is illustrated in FIG. 24 and which includes the azimuth motor relay R3 and the stepping switch relay R12. It is the stepping switch relay R12 that sequences completely the operation of the machine thereafter in the manner that has been described previously in connection with the description of the seven parallel circuits which are used for operating relay R12. In view of the earlier description of these circuits, only a brief summary is necessary at this time. During the first spin revolution, all contacts associated with the azimuth motor relay R3 are open and casing 106 is rotated around its spin axis until it completes its first revolution or a portion thereof, depending upon the position of the spin switch cam on the expansion hub at the time of the starting spin position. In order to avoid 100% overlap of ribbon 110 after the completion of the first revolution, this cam is so positioned on the hub that the azimuth rotation begins after approximately 300° to 320° of the spin rotation during the first revolution. Thus the "first revolution" (300°– 320°) is made somewhat less than 360°, whereupon azimuth motor relay R3 becomes energized in the manner which will be described presently.

Such energization of relay R3 is obtained by transferring the armature of the spin switch 201A, FIG. 24, from the upper contact 2440 to the lower contact 2423, whereupon the stepping switch relay R12 is energized over the previously described third circuit, including contacts S1C, S2C, S3C, S5C, S7C, conductors 2414 and 2415 and push button switch 71. The stepping switch relay R12 then is stepped upon the return of the spin switch 201A to its upper contact 2440, which breaks the third circuit, with the concommitant rotation of the stepping switch from its 20° to its 30° position. At this time, according to FIGS. 29 and 30, cams 1 and 4 have notches, with the result that contacts S1A and S1B are closed and contact S1C is open, while the cam switches on cam 4 remain in the same position, i.e., contacts S4A and S4B are closed and S4C is open. Upon the return of spin switch 201A to its upper contact 2440, contacts S1B are closed and, with the switch 80 and its arm 2442 being on contact 2425, relay R3 becomes energized over conductor 2416 and the now closed contacts R13A of relay R13. Simultaneously, contacts S1A also become closed, with the result that the charging circuit of the timing capacitor 2615 is established over conductor 2630, network 2627, variable resistor 2620, contacts S1A and capacitor 2615, the spin switch 201B on contact 2631 and buss 2716. Therefore, the duration of the interval of time when the azimuth motor relay R3 remains energized is now controlled by the timer and its contacts R13A of relay R13 which is in the circuit of the timer. When the timer times out, the relay R13 becomes energized, contacts R13 become open and azimuth motor relay R3 becomes de-energized, thus stopping the azimuth rotation. Such operation of the azimuth motor relay R3 continues to the very end of the operating cycle of the machine by sequentially transferring the timing operation of the azimuth motor relay R3 from sector to sector, the remaining sectors being sectors B, C, D and E, which are also indicated in FIG. 24 and were described earlier, thus indicating the circuit which controls the operation of relay R3 during the above mentioned sectors. Simultaneously, there is also a sequential corresponding operation of the timing circuit by the sequential closing and opening of contacts S2A, S3A, S7A and S5A, thus completing the winding of the variable pitch composite spiral shown in FIG. 3.

The only remaining portion of the cycle that needs additional description is the sequential operation of the programmer, and especially of the card reading switch, and the stepping switch. When the card reading switches scan one of the scales of card 60 and produces signals in response to such indentations as indentations 121–125, the cycle of operation relating to indentation 120, which is the very first indentation, has been described already. When indentation 120 is encountered, it actuates relay R12 through the circuit including conductor 2410, contacts S8A, the card reading switch 56, contacts 2411, conductor 2414, push button switch 71 and relay R12. The casing then is rotated about the spin axis approximately one complete revolution, whereupon the spin switch 201A is energized, with the result that relay R12 is again energized and the stepping switch stepped one additional 10° step from 20° to 30° through the circuit including conductor 2410, contacts R10C, the spin switch 201A, which is now on contact 2423, contacts S1C, S2C, S3C, S5C, S7C, conductor 2414, push button switch 71 and relay R12. In the 30° position, according to FIGS. 29 and 30, cam #1 now has a notch at 30° with the result that contacts S1A and S1B are now closed and contacts S1C are open. Accordingly, the azimuth motor relay circuit is now closed through the circuit including conductor 2410, contacts R10C, spin switch 201A, now closed contacts S1B, switch 88 on contact 2425, conductor 2416, contacts R13 and relay R3. The duration of the azimuth rotation during each spin revolution at this time is controlled by resistance 2620 and resistive network 2627, which are connected in series with the charging circuit of capacitor 2615. The above operation of the machine corresponds to the winding of the ribbon in sector A. Upon the completion of this winding and advancement of the card reading switch from indentation 120 to indentation 122, when the card reading switch 56 encounters indentation 122, it again energizes the stepping switch relay R12 through the circuit including switch 56 and contacts 2411, with the result that the stepping switch is transferred to the 40° position at which cam #2 has a notch, with the result that now contacts S2A and S2B are closed and contacts S2C are open. Accordingly, relay R3 now is under control of the circuit including contacts S2B, conductor 2410, contacts R10C and contacts R13A, with the result that winding of the ribbon is continued through sector B with relay R3 remaining closed for those intervals of time which are determined by resistor 2621 and any additional resistors connected in series with resistor 2621 in the resistive network 2627. The card reading switch then scans the remaining indentations on scale 126 until the 80° position is reached, at which time there are no more connections through the circuits leading to the azimuth motor relay R3, and, therefore, the azimuth rotation is terminated but the spin rotation still continues until the spin switch 201A is transferred to contact 2423, at which time the circuit to relay R12 is established through the spin switch 201A on contacts 2423 and contacts S1C, S2C, S3C, S5C and S7C, conductor 2412, push button switch 71 and conductor 2415. This circuit remains closed until the switch is quickly stepped to the 90° position, at which time cam #6 has a long notch continuing all the way up to and including 170°, with the result that the stepping switch now is stepped quickly to its home position through the circuit including contacts S4B, conductor 2410, contacts S6A, conductor 2428, conductor 2420, self-interrupting contacts 2404, conductor 2421 and relay R12. Because of the presence of the self-interrupting contacts 2404 in this circuit, relay R12 steps the stepping switch quickly to its home position, at which time contacts S4B are open, with the result that contacts S6C open and therefore, the entire programmer becomes disconnected, except for relay R1, which maintains power connected to the programmer so that the programmer can be restarted again upon mounting of another tire casing.

In the machine illustrated in FIG. 1 and supplementary figures relating to the construction of the azimuth column 16, it has been stated that the azimuth column has a turret 150 and three different diameters and different expansion range hubs 151, 152 and 153 which are indexable into an operative spin position. This structure is most effective in providing the entire range of hubs that may be required in a shop which retreads or recaps the entire range of tires from the smallest passenger tire to the largest truck tire. The arrangement merely requires unlocking and turning of the turret and subsequent locking of the turret for replacing one hub with another. Thus there are no loose parts to be laboriously handled by the operator in the arrangement of the above type. The disadvantage of such structure resides in the fact that it is costly.

Figure 34:
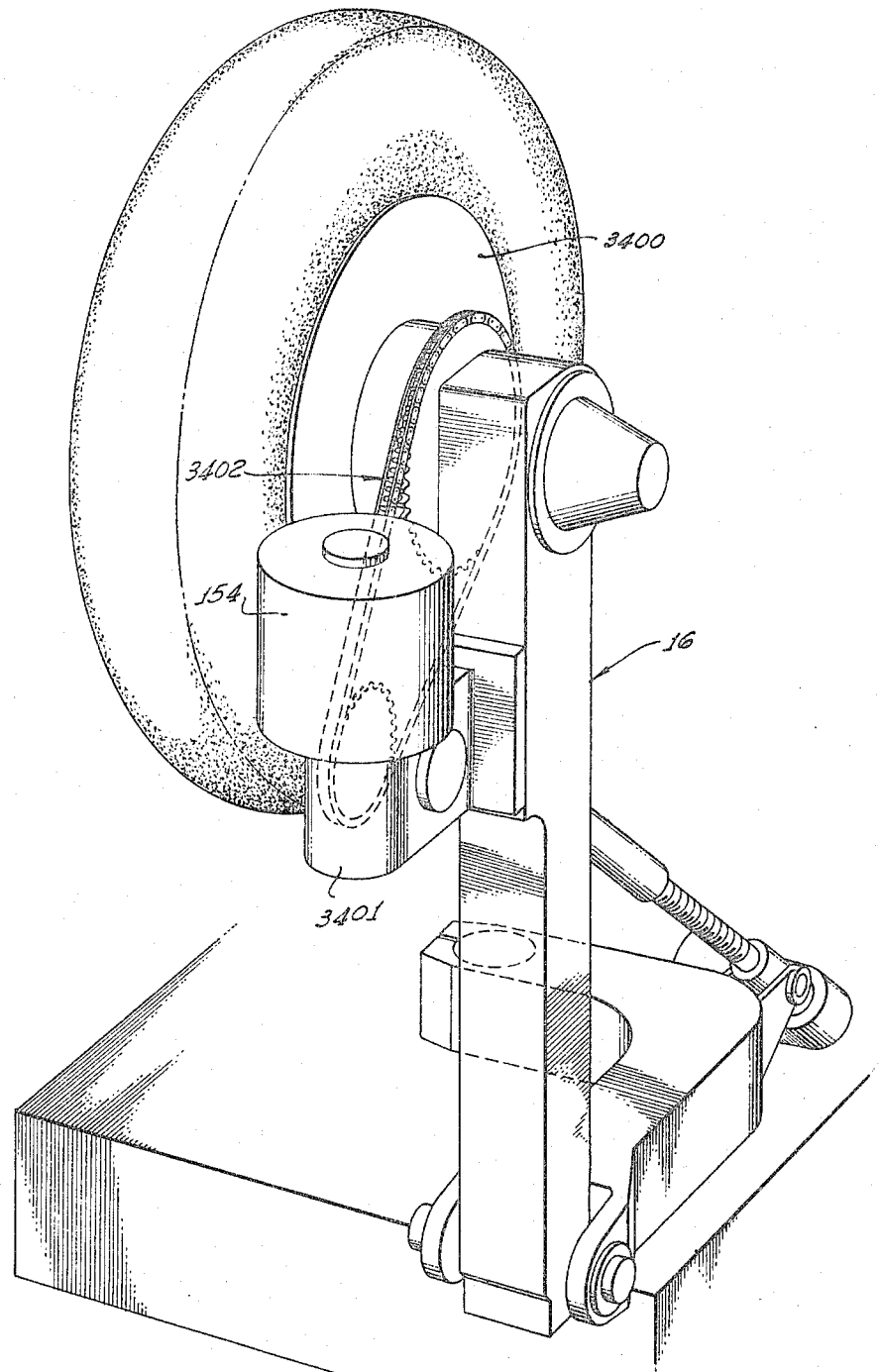
FIGURE 34 is a perspective view of an alternative form of an azimuth column and spin motor drive.

A less expensive arrangement is illustrated in FIG. 34 which has only one expansible hub 3400 of small diameter mounted on a spin axle. In order to obtain the same range of expansion with the hub of this type, the hub is provided with a slidable ring of shoes and a plurality of rings of different outside diameter are then mountable on such hub, thus obtaining the same expansion range as that obtainable in FIG. 1, but with a structure which is less expensive than the arrangement illustrated in FIG. 1. The disadvantage of such structure is that a plurality of shoe rings is required which must be handled by the operator. Expansible hubs of this type are disclosed in the co-pending application of Walther E. F. Lehmann, filed June 12, 1964, having Serial Number 375,591, entitled Expandable Wheel for Mounting Pneumatic Tire Casing, and having the common assignee. With the hub of this type, it then is possible to dispense with the rotatable mandrel. The spin motor 154 then can be mounted on the azimuth column 16 by means of a bracket 3401 and a chain drive 3402 then couples the azimuth motor 154 to the rotatable hub 3400. All other elements of the machine illustrated in FIG. 34 are identical to those described and illustrated in the earlier figures. As described previously, the spin motor 154 is a variable spin motor and, therefore, the desired range of speed can be obtained electrically with the aid of the circuit disclosed in FIG. 25 by changing the values of the potentiometer resistor 2516 and of the resistors 2560 and 2561.

In the introductory part of the specification it has been stated that the disclosed machine and programmer are also applicable for applying a variable thickness layer to an outer surface of a green tire casing of a pneumatic tire. There are two methods of making green casings of pneumatic tires. In one method the casing, from the very beginning, has the semi-toroidal shape of the type disclosed in FIGS. 14 and 34. When this is the case, then what has been described thus far is applicable directly to the new tire casings without any modifications. A more common method of making tires, which is now in use, is the one in which the green casing is in the form of a hollow, right cylinder mounted on a collapsible cylindrical drum. In order to make the machine of the disclosed type applicable to the new tire casings of the cylindrical type, it is merely necessary to convert the rotational azimuth movement disclosed in FIG. 1 to a translation, or linear, movement. Such linear movement can be obtained either by moving the ribbon in the direction parallel to the longitudinal axis of the drum or, in an alternative arrangement, mounting the drum on two parallel rails which are also parallel to the longitudinal axis of the drum and then slide such drum back and forth on such rails. The machine of the above type is disclosed in my co-pending application Serial Number 196,542, filed May 1, 1962, entitled Method and Apparatus for Applying Elastomeric Tread and Sidewalls on Pneumatic Tire Casing.

What I claim as new is:

1. In a machine for winding an elastomeric ribbon on the surface of a curved tire casing, the combination comprising, a frame, a base mounted on said frame for rotation about a fixed substantially vertical axis, a substantially vertical column pivotally mounted on said base eccentrically of said fixed vertical axis, said column being angularly positionable in a vertical plane with respect to said base, means located on said column supporting said tire casing for rotation about its normal axis, means mounted on said frame for applying said elastomeric ribbon to the surface of said tire casing, said applying means feeding said ribbon to said tire casing surface substantially perpendicular to said vertical axis, motor means for rotating said tire casing about its normal axis so as to cause said ribbon to be wound around said tire, motor means for rotating said base around its fixed vertical axis to cause said tire to angularly change the relative position of its surface with respect to said means for applying said ribbon and means for pivoting said column to vary said angular position of said column with respect to said base whereby said ribbon may be wound across the face of the tire.

2. The combination according to claim 1 wherein the means for rotating said base includes a reversible variable speed motor and control means for selectively varying the speed and direction of said motor.

3. The combination according to claim 1 including selectively operable control means for applying said ribbon, rotating said tire casing, rotating said base and pivoting said arm, and means for predetermining and programming the operation of said control means in accordance with the tire casing and ribbon to be wound and means for performing said predetermined program and operations.

4. The combination according to claim 1 wherein the means for pivoting said column comprises a motor driven reversible screw, one end of which being secured to said base, the other end of which being secured to said column.

5. The combination as defined in claim 1 wherein the means for applying said ribbon comprises, a stitcher arm having a longitudinal axis, a stitcher mounted at one end of said stitcher arm, said stitcher arm being mounted in said housing and having means to slide said stitcher toward and away from the tire casing, said longitudinal axis being substantially on the same level as the normal axis of said casing.

6. The combination as defined in claim 1 in which the column includes a plurality of rotatable hubs mounted on said column, means for rotating and locking the desired hub into an operating position, said operating position placing the rotational axis of said desired hub into a horizontal plane.

References Cited by the Examiner
UNITED STATES PATENTS

| Re. 25,349 | 3/1963 | Hanson | 156—130 |
| 1,335,879 | 4/1920 | Darrow | 156—130 X |
| 2,009,599 | 7/1935 | Woock | 156—130 X |

EARL M. BERGERT, *Primary Examiner.*

C. B. COSBY, *Assistant Examiner.*